(12) United States Patent
Yoda

(10) Patent No.: US 10,929,629 B2
(45) Date of Patent: Feb. 23, 2021

(54) POSITIONAL RELATIONSHIP DETECTION DEVICE AND POSITIONAL RELATIONSHIP DETECTION SYSTEM

(71) Applicant: DENSO WAVE INCORPORATED, Aichi-pref. (JP)

(72) Inventor: Takuya Yoda, Aichi-pref. (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 0 days.

(21) Appl. No.: 16/716,547

(22) Filed: Dec. 17, 2019

(65) Prior Publication Data

US 2020/0202095 A1    Jun. 25, 2020

(30) Foreign Application Priority Data

Dec. 25, 2018   (JP) .............................. JP2018-240601

(51) Int. Cl.
  *G06K 7/14* (2006.01)
  *G06T 7/73* (2017.01)
(52) U.S. Cl.
  CPC ......... *G06K 7/1456* (2013.01); *G06K 7/1417* (2013.01); *G06T 7/73* (2017.01)
(58) Field of Classification Search
  CPC ...................................................... G06T 7/73
  See application file for complete search history.

(56) References Cited

U.S. PATENT DOCUMENTS

2016/0292628 A1    10/2016   Nagamatsu

FOREIGN PATENT DOCUMENTS

JP        2015045952   *    3/2015
JP        2016-194833 A     11/2016

* cited by examiner

*Primary Examiner* — Laura A Gudorf
(74) *Attorney, Agent, or Firm* — Harness, Dickey & Pierce, P.L.C.

(57) ABSTRACT

A positional relationship detection device that detects positional relationships among a plurality of types of articles displayed in a display shelf partitioned by a plurality of shelf boards is provided. Information codes with specific information recorded are arranged at respective positions at which respective types of articles are displayed, the specific information being configured to specify the types of the articles by using the shelf boards. A guide code with prescribed arrangement information recorded is disposed such that a rotation angle of the guide code becomes a prescribed angle with respect to the shelf boards, the prescribed arrangement information indicating that the guide code is an information code arranged such that rotation angle of the guide code with respect to the shelf boards becomes the prescribed angle.

10 Claims, 21 Drawing Sheets

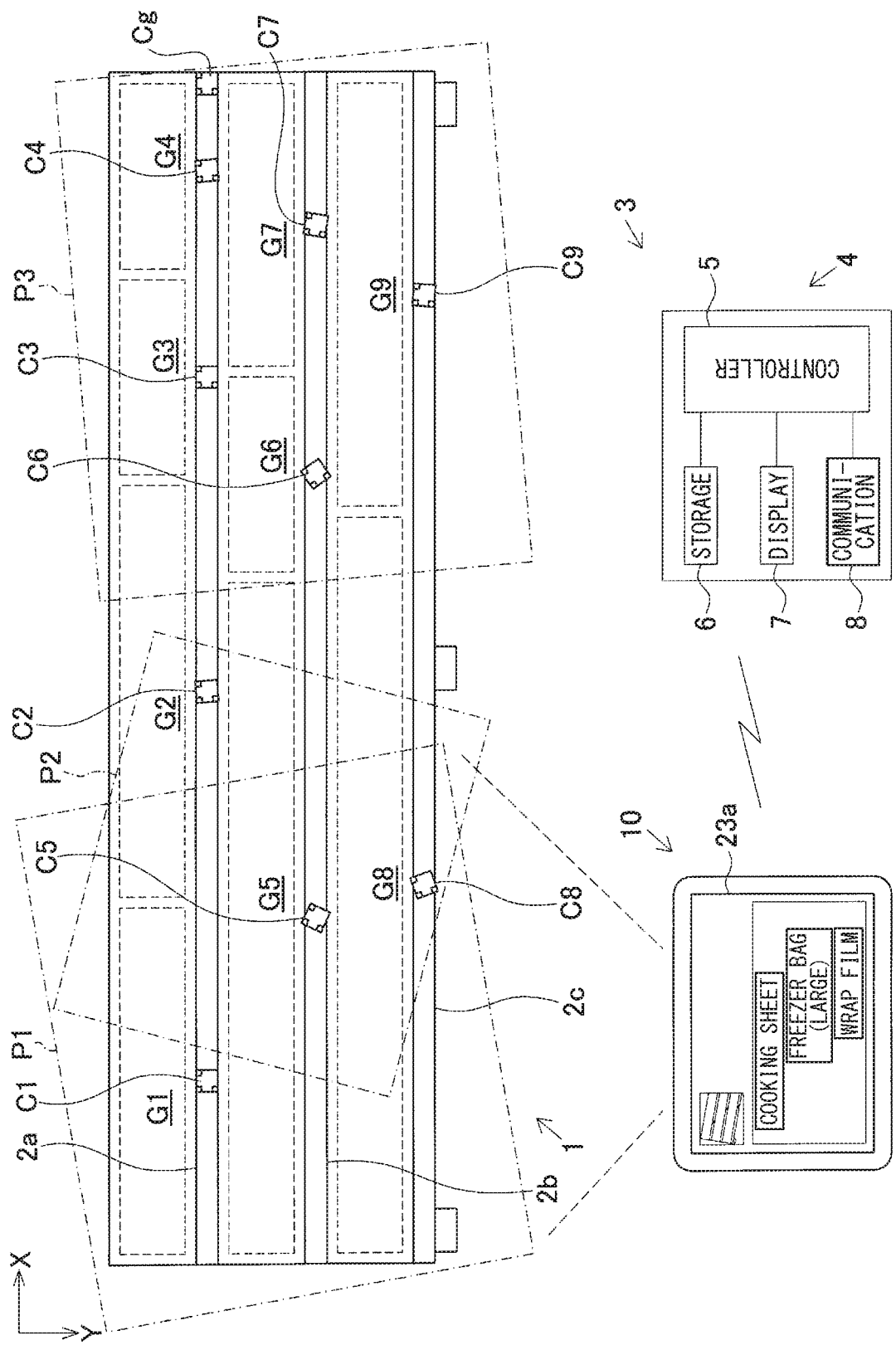

FIG. 9A

| DETECTED CODE | SPECIFIC INFORMATION | RELATIVE POSITION INFORMATION | ROTATION ANGLE |
|---|---|---|---|
| C1 | COOKING SHEET | (0, 0) | 10° |
| C5 | FREEZER BAG (LARGE) | (26, 25) | 35° |
| C8 | WRAP FILM | (29, 46) | −10° |

FIG. 9B

| DETECTED CODE | SPECIFIC INFORMATION | RELATIVE POSITION INFORMATION | ROTATION ANGLE |
|---|---|---|---|
| C1 | COOKING SHEET | (0, 0) | 10° |
| C5 | FREEZER BAG (LARGE) | (26, 25) | 35° |
| C8 | WRAP FILM | (29, 46) | −10° |
| C2 | FRYING PAN FOIL | (71, 13) | 5° |

FIG. 9C

| DETECTED CODE | SPECIFIC INFORMATION | RELATIVE POSITION INFORMATION | ROTATION ANGLE |
|---|---|---|---|
| C1 | COOKING SHEET | (0, 0) | 10° |
| C5 | FREEZER BAG (LARGE) | (26, 25) | 35° |
| C8 | WRAP FILM | (29, 46) | −10° |
| C2 | FRYING PAN FOIL | (71, 13) | 5° |
| C6 | FREEZER BAG (MEDIUM) | (107, 39) | −25° |
| C3 | ALUMINUM FOIL | (128, 23) | 10° |
| C9 | PLASTIC BAG | (136, 65) | 15° |
| C7 | FREEZER BAG (SMALL) | (152, 47) | 20° |
| C4 | PLASTIC CONTAINER | (165, 29) | 5° |

FIG. 10

| DETECTED CODE | SPECIFIC INFORMATION | RELATIVE POSITION INFORMATION | ROTATION ANGLE |
|---|---|---|---|
| C1 | COOKING SHEET | (0, 0) | 0° |
| C5 | FREEZER BAG (LARGE) | (30, 20) | 25° |
| C8 | WRAP FILM | (36, 40) | −20° |
| C2 | FRYING PAN FOIL | (72, 0) | −5° |
| C6 | FREEZER BAG (MEDIUM) | (112, 20) | −35° |
| C3 | ALUMINUM FOIL | (130, 0) | 0° |
| C9 | PLASTIC BAG | (145, 40) | 5° |
| C7 | FREEZER BAG (SMALL) | (153, 20) | 10° |
| C4 | PLASTIC CONTAINER | (168, 0) | −5° |

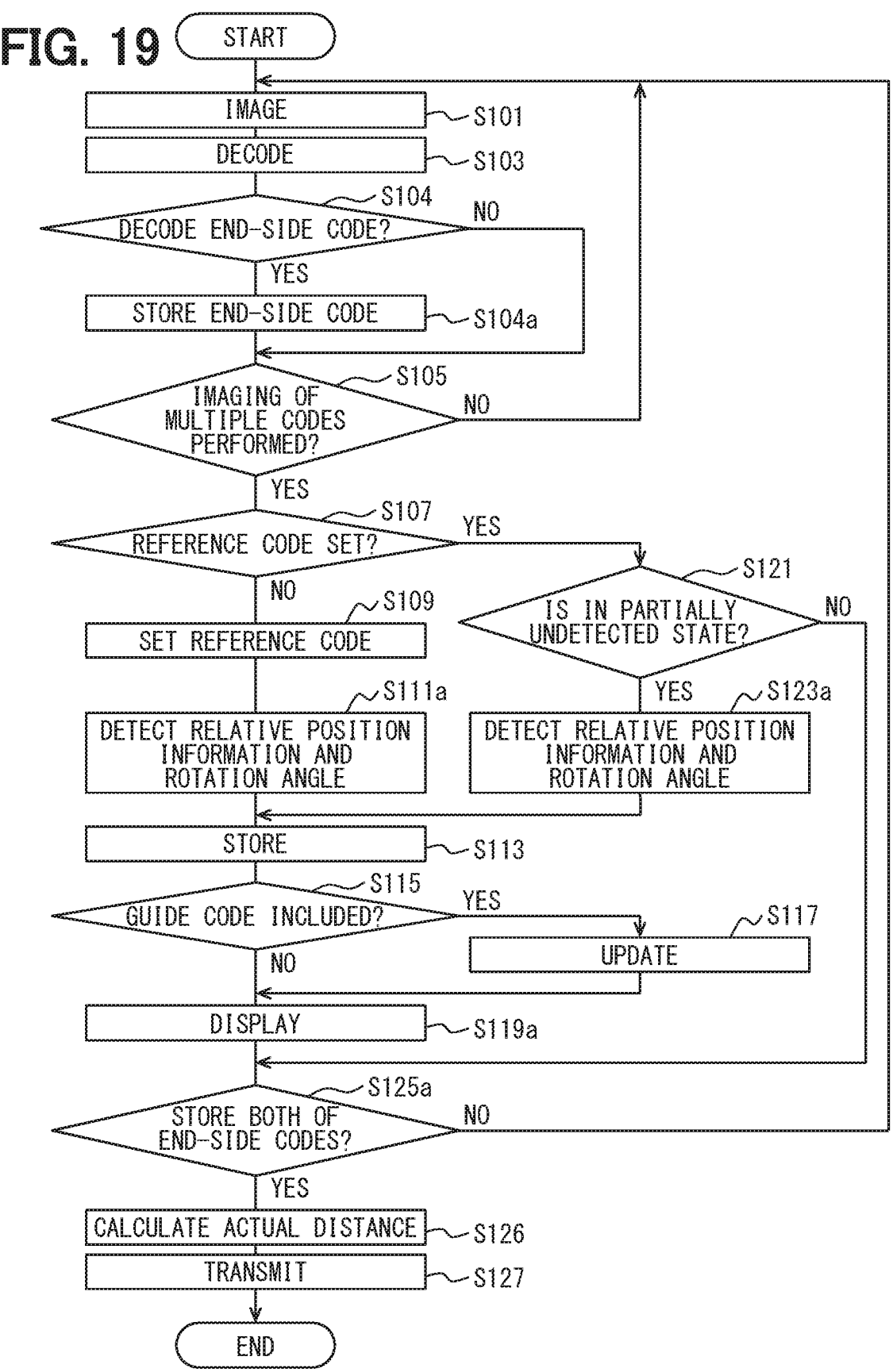

POSITIONAL RELATIONSHIP DETECTION DEVICE AND POSITIONAL RELATIONSHIP DETECTION SYSTEM

CROSS REFERENCE OF RELATED APPLICATIONS

The present application claims the benefit of priority from Japanese Patent Application No. 2018-240601 filed on Dec. 25, 2018. The entire disclosures of all of the above applications are incorporated herein by reference.

TECHNICAL FIELD

The present disclosure relates to a positional relationship detection device and a positional relationship detection system that detect a positional relationship between respective articles displayed in a display shelf using an information code.

BACKGROUND

Regarding management of goods or the like displayed in a display shelf, there may be a request for grasping a positional relationship between goods in the display shelf. For example, a goods display position determination processing method has been known as a technology relating to a positional relationship detection device that detects the positional relationship between the goods or the like displayed in the display shelf.

SUMMARY

According to one aspect of the present disclosure, a positional relationship detection device, which detects positional relationships among a plurality of types of articles displayed in a display shelf partitioned by a plurality of shelf boards, is provided. Information codes with specific information recorded are arranged at respective positions at which respective types of articles are displayed, the specific information being configured to specify the types of the articles by using the shelf boards. A guide code with prescribed arrangement information recorded is disposed such that a rotation angle of the (52 guide code becomes a prescribed angle with respect to the shelf boards; the prescribed arrangement information indicating that the guide code is an information code arranged such that rotation angle of the guide code with respect to the shelf boards becomes the prescribed angle.

BRIEF DESCRIPTION OF DRAWINGS

Objects, features and advantages of the present disclosure will become more apparent from the following detailed description made with reference to the accompanying drawings. In the drawings:

FIG. 1 is an explanatory diagram showing a mobile terminal, a positional relationship detection system, and a display shelf of a detection target according to a first embodiment;

FIG. 9A is an explanatory diagram for describing specific information, relative position information, and a rotation angle stored in a storage portion, which shows a storage state when an image of an imaging area P1 in FIG. 1 is captured;

FIG. 9B is an explanatory diagram for describing specific information, relative position information, and a rotation angle stored in a storage portion, and shows a storage state when an image is captured while moving from the imaging area P1 to an imaging area P2 in FIG. 1;

FIG. 9C is an explanatory diagram for describing specific information, relative position information, and a rotation angle stored in a storage portion, and shows a storage state when an image is captured while moving from the imaging area P1 to an imaging area P3 in FIG. 1;

FIG. 10 is an explanatory diagram for describing relative position information and a rotation angle updated from the state of FIG. 9C in response to a rotation angle of a guide code;

FIG. 19 is a flowchart illustrating a flow of positional relationship detection processing performed by a controller in the third embodiment;

DETAILED DESCRIPTION

Figure 2A:
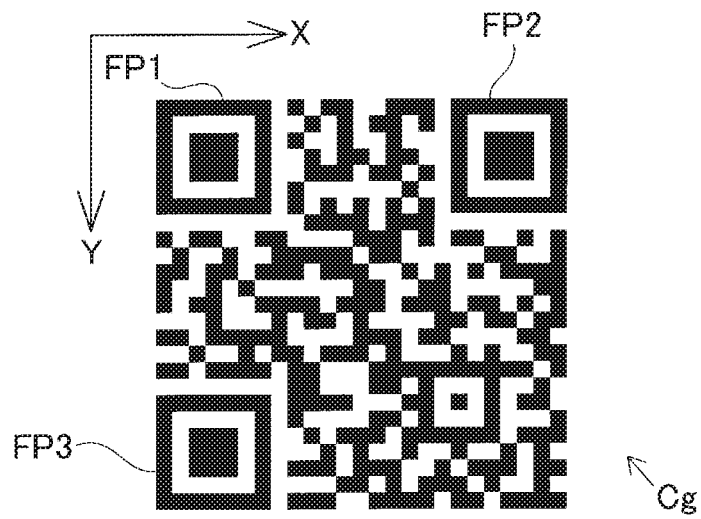
FIG. 2A is an explanatory diagram for describing an arrangement state of a guide code.

A goods display position determination processing method has been known as a technology relating to a positional relationship detection device that detects the positional relationship between the goods displayed in a display shelf. In a goods display position determination processing method according to a related art, a position label with position identification information for identifying each position of a goods display shelf and a goods label with goods identification information for identifying respective goods displayed in the goods display shelf are attached onto a front surface of each shelf board of the goods display shelf. When a captured image of the goods display shelf is acquired, coordinates of the position identification information and the goods identification information detected from the captured image on the captured image are specified. When a set of adjacent position identification information is selected, and goods identification information is detected between the selected set of position identification information, it is recorded in a goods display position master that goods associated with the detected goods identification information are displayed between two positions associated with the selected set of position identification information. Thus, a user may create the goods display position master without performing a complicated position registration operation, only by imaging the goods display shelf.

According to a related art, there may be a case where a position of goods identification information between a set of position identification information may not be specified unless the set of position identification information is imaged. For this reason, when each position identification information is arranged at a short interval, a space in which goods identification information is arranged may become narrow. Particularly, in many cases, display shelves provided in a store may be installed to be long along an aisle, and in a case where the display shelves installed as such is not reflected in one captured image, it may be difficult to grasp what positional relationship the respective goods have.

For example, a method of connecting a plurality of captured images consecutively captured like a panoramic image to each other to generate a single large image and detecting each positional relationship may be considered. At the time of connecting the respective captured images to each other, it may be difficult to grasp whether all the information codes installed on the display shelf are readably imaged. In that case, even though it tries to acquire a positional relationship from each information code after connecting all the captured images to each other, there may be a case where a position at which the positional relationship cannot be acquired occurs. In such a case, it may be necessary to take a picture from the first, which may be inefficient.

The present disclosure provides a configuration capable of detecting a positional relationship between respective articles even though the respective articles are displayed in a display shelf in which all information codes arranged by using shelf boards are not imaged in one captured image.

According to one aspect of the present disclosure, a positional relationship detection device detects positional relationships among a plurality of types of articles displayed in a display shelf partitioned by a plurality of shelf boards, information codes with specific information recorded being arranged at respective positions at which respective types of articles are displayed, the specific information being configured to specify the types of the articles by using the shelf boards, a guide code with prescribed arrangement information recorded being disposed such that a rotation angle of the guide code becomes a prescribed angle with respect to the shelf boards, the prescribed arrangement information indicating that the guide code is an information code arranged such that rotation angle of the guide code with respect to the shelf boards becomes the prescribed angle. The positional relationship detection device may comprise: an imaging portion; a reading section that reads an information code included in a captured image captured by the imaging portion; a detection section that detects a rotation angle of any one information code of two or more information codes and, after performing rotational projective transformation on one captured image such that the detected rotation angle becomes the prescribed angle, detects relative position information on relative positions among the information codes and rotation angles of the respective information codes; at the time of imaging a plurality of codes in which the two or more of the information codes having the specific information are included in the captured image captured by the imaging portion, the specific information being read by the reading section; a storage portion that stores as information of detected codes, the specific information of the information codes whose relative position information and rotation angles are detected by the detection section together with a detection result by the detection section; an update section that updates the relative position information and the rotation angles stored in the storage portion in response to an imaging state of the guide code imaged by the imaging portion; and a determination section that determines whether the captured image is in a partially undetected state where the information code whose specific information is not stored in the storage portion is included as an undetected code together with at least one detected code at the time of the imaging of the plurality of codes. The detection section detects the relative position information among the respective information codes and the rotation angles of the respective information codes for the two or more information codes that are imaged, at the time of the imaging of the plurality of codes in a state where the storage portion does not store the detected code. The detection section detects a rotation angle of the one detected code and detects the relative position information and the rotation angle of the undetected code after performing the rotational projective transformation on the captured image so that the detected rotation angle becomes the rotation angle stored in the storage portion in relation to the detected code, for the captured image determined to be in the partially undetected state by the determination section. The update section performs rotational projective transformation to correct a virtual plane in which the respective information codes are virtually arranged in response to the relative position information and the rotation angles stored in the storage portion until detection of a rotation angle of the guide code so that a detected rotation angle of the guide code becomes the prescribed angle in a case where the detection section detects the rotation angle of the guide code. The update section updates the relative position information and the rotation angles stored in the storage portion in response to the relative position information and the rotation angles of the respective information codes virtually arranged on the virtual plane after being corrected.

According to another aspect of the present disclosure, a positional relationship detection system may comprise: the positional relationship detection device; and a server that manages the positional relationship detection device. The positional relationship detection device includes a transmission portion that transmits at least a part of information stored in the storage portion to the server at a predetermined timing. The server includes a reception portion that receives the information transmitted by the transmission portion, and a management portion that manages positional relationships among a plurality of types of articles displayed in the display shelf using a reception result by the reception portion.

According to another aspect of the present disclosure, a positional relationship detection system may be provided. The positional relationship detection system detects positional relationships among a plurality of types of articles displayed in a display shelf partitioned by a plurality of shelf boards.

The positional relationship detection system may comprise: a mobile terminal that includes an imaging portion; and a server that performs processing for detecting the positional relationships among the plurality of types of articles using a captured image captured by the imaging portion. Information codes with specific information recorded being arranged at respective positions at which respective types of articles are displayed, the specific information being configured to specify the types of the articles by using the shelf boards. A guide code with prescribed arrangement information recorded being disposed such that a rotation angle of the guide code becomes a prescribed angle with respect to the shelf boards, the prescribed arrangement information indicating that the guide code is an information code arranged such that rotation angle of the guide code with respect to the shelf boards becomes the prescribed angle. The mobile terminal includes a transmission portion that transmits information including the captured image of the imaging portion to the server at a predetermined timing. The server includes a reception portion that receives the information transmitted by the transmission portion, a reading section that reads the information codes included in the captured image received by the reception portion, a detection section that detects a rotation angle of any one information code of two or more information codes and, after performing rotational projective transformation on one captured image such that the detected rotation angle becomes the prescribed angle, detects relative position information on relative positions among the respective information codes and rotation angles of the respective information codes, at the time of imaging a plurality of codes in which the two or more of the information codes having the specific information are included in the captured image received by the reception portion, the specific information being read by the reading section, a storage portion that stores as information of detected codes, the specific information of the information codes whose relative position information and rotation angles are detected by the detection section together with a detection result by the detection section, an update section that updates the relative position information and the rotation angles stored in the storage portion in response to an imaging state of the guide code included in the captured image received by the reception portion, and a determination section that determines whether the captured image is in a partially undetected state where the information code whose specific information is not stored in the storage portion is included as an undetected code together with at least one detected code at the time of the imaging of the plurality of codes. The detection section detects the relative position information among the respective information codes and the rotation angles of the respective information codes for the two or more information codes that are imaged, at the time of the imaging of the plurality of codes in a state where the storage portion does not store the detected code. The detection section detects a rotation angle of the one detected code and detects the relative position information and the rotation angle of the undetected code after performing the rotational projective transformation on the captured image so that the detected rotation angle becomes the rotation angle stored in the storage portion in relation to the detected code, for the captured image determined to be in the partially undetected state by the determination section. The update section performs rotational projective transformation to correct a virtual plane in which the respective information codes are virtually arranged in response to the relative position information and the rotation angles stored in the storage portion until detection of a rotation angle of the guide code so that a detected rotation angle of the guide code becomes the prescribed angle in a case where the detection section detects the rotation angle of the guide code. The update section updates the relative position information and the rotation angles stored in the storage portion in response to the relative position information and the rotation angles of the respective information codes virtually arranged on the virtual plane after being corrected.

According to the configuration, in the display shelf, the information codes in which the specific information capable of specifying the types of articles is recorded are arranged, respectively, using the shelf boards, for each position at which the respective types of articles are displayed. The guide code in which the prescribed arrangement information is recorded is arranged so that the rotation angle is the prescribed angle. At the time of imaging of the plurality of codes in a state where the detected codes are not stored in the storage portion, the relative position information among the respective information codes and the rotation angles of the respective information codes are detected by the detection portion. In addition, for the captured image determined to be in the partially undetected state where the undetected code is included together with at least one detected code, the rotation angle of the one detected code is detected by the detection portion, and the relative position information and the rotation angle of the undetected code are detected after the rotational projective transformation is performed on the captured image so that the detected rotation angle becomes the rotation angle stored in the storage portion in relation to the detected code. In a case where a rotation angle of the guide code is detected by the detection portion, the update section performs rotational projective transformation to correct a virtual plane in which the respective information codes are virtually arranged in response to the relative position information and the rotation angles stored in the storage portion until the detection of the rotation angle of the guide code so that the detected rotation angle of the guide code becomes a prescribed angle, and the update section updates the relative position information and the rotation angles stored in the storage portion in response to the relative position information and the rotation angles of the respective information codes virtually arranged on the virtual plane after being corrected.

Thus, after the relative position information and the rotation angles of the two or more information codes first captured by the imaging portion are detected, by performing imaging so as to move the imaging area by the imaging portion along the longitudinal direction of the display shelf, whenever a new information code, that is, the undetected code is imaged, the relative position information and the rotation angle of the undetected code are detected and stored as information of the detected code in the storage portion. Further, after the rotational projective transformation is performed on the captured image so that the rotation angle of the detected code becomes the rotation angle stored in the storage portion, the relative position information and the rotation angle of the undetected code are detected. Therefore, even in a case where the respective information codes are arranged at different rotation angles on the shelf boards, respectively, or even in a case where an inclination of the imaging portion with respect to the display shelf is changed for each imaging, it is possible to detect accurately the relative position information of the respective information codes. In particular, when the guide code is detected, the relative position information and the rotation angles stored in the storage portion are updated so that the rotation angle of the guide code becomes the prescribed angle. Therefore, rotation angles suitable for actual arrangement states of the respective information codes with respect to the display shelf can be detected, and it is thus possible to more accurately detect the relative position information of the respective information codes. For this reason, after all the information codes are read, the positional relationships among the types of articles specified from the specific information of the detected code, that is, the positional relationships among the respective articles displayed in the display shelf can be detected on the basis of the relative position information of the respective detected codes stored in the storage portion, Therefore, even though the respective articles are displayed in the display shelf in which all the information codes arranged by using the shelf boards are not imaged in one captured image, it is possible to detect the positional relationship between the respective articles.

Further, according to the present disclosure, information on the sizes of the information codes may be recorded in the information codes, in addition to the specific information. For this reason, it is possible to accurately obtain the sizes of the information codes for detecting the relative positional relationships, and it is possible to detect the positional relationships among the respective articles with a high accuracy.

Further, according to the present disclosure, all the information codes may be formed in the same size. Therefore, sizes of other information codes need not be grasped by grasping a size of one information code, and it is possible to reduce a detection processing load with respect to the detection of the relative positional relationship.

Further, according to the present disclosure, an information code in which one end side information indicating one end of the display shelf in a longitudinal direction is recorded may be arranged on a portion of the shelf board positioned at one end of the display shelf in the longitudinal direction, and an information code in which the other end side information indicating the other end of the display shelf in the longitudinal direction is recorded may be arranged on a portion of the shelf board positioned at the other end of the display shelf in the longitudinal direction. The one end side information read by the reading part and the other end side information read by the reading part may be stored in the storage portion. Thus, from the fact that both of the one end side information and the other end side information are stored in the storage portion, it can be determined that an imaging area is moved from one end of the display shelf to the other end of the display shelf in the longitudinal direction, and it can be easily estimated that all the information codes arranged in the display shelf are read.

Further, according to the present disclosure, information for specifying the display shelf may be included in at least any one of the one end side information and the other end side information. It is possible to not only grasp the display shelf from one end (also referred to as a first end) of the display shelf to the other end (also referred to as a second end, a different end) of the display shelf in the longitudinal direction, but also to easily grasp in which display shelf the positional relationships among articles are detected.

Further, according to the present disclosure, the detection portion may detect a reference code size of any one information code, detect the relative position information among the respective information codes and the rotation angles of the respective information codes, and detect size ratios of the remaining information codes to the reference code size, with respect to the two or more information codes that are imaged, at the time of the imaging of the plurality of codes in the state where the detected code is not stored in the storage portion. In addition, the detection portion may detect the rotation angle of the one detected code, and may detect the relative position information and the rotation angle of the undetected code and detect a size ratio of the undetected code to the reference code size after performing the rotational projective transformation on the captured image so that the detected rotation angle becomes the rotation angle stored in the storage portion in relation to the detected code, with respect to the captured image determined to be in the partially undetected state by the determination portion.

Thus, even in a case where the sizes (actual dimensions) of the respective information codes arranged in the display shelf are not grasped, it is possible to detect the size ratios of the remaining information codes based on the reference code size, which is an image size of the information code whose rotation angle is first detected. It is thus possible to detect the relative positional relationships among the respective information codes in consideration of the size ratios.

Further, according to the present disclosure, one end side code may be arranged as an information code in which one end side information indicating one end of the display shelf in a longitudinal direction is recorded on a portion of the shelf board positioned at one end of the display shelf in the longitudinal direction, the other end side code may be arranged as an information code in which the other end side information indicating the other end of the display shelf in the longitudinal direction is recorded on a portion of the shelf board positioned at the other end of the display shelf in the longitudinal direction, and information on a length of the display shelf in the longitudinal direction may be included in at least any one of the one end side information and the other end side information. A calculation portion may calculate actual distances among the respective information codes on the basis of the plurality of relative position information, on the assumption that an actual distance between the one end side code and the other end side code in the longitudinal direction coincides with the length of the display shelf in the longitudinal direction obtained by reading of the reading part.

Even though relative positional relationships among the respective information codes in terms of a ratio from a plurality of pieces of relative position information stored in the storage portion can be grasped, it may be difficult to accurately calculate the actual distances or dimensions only by the captured image. On the other hand, it may be considered that an actual distance between one end side code and the other end side code in the longitudinal direction coincides with a length of the display shelf in the longitudinal direction obtained by reading one end side code or the other end side code. For this reason, it is possible to calculate the actual distances among the respective information codes based on the other relative positional relationships by using, as a reference, a relative positional relationship between one end side code and the other end side code between which the actual distance can be grasped.

Further, according to the present disclosure, a display portion may be provided on which information indicating types of articles each specified from the two or more detected codes stored in the storage portion is displayed in a first display area in response to the relative position information and a current captured image captured by the imaging portion is displayed in a second display area. Thus, when the user moves the imaging area in the longitudinal direction of the display shelf while viewing the current captured image displayed in the second display area, the information indicating the types of articles displayed in the display shelf is added to and displayed in the first display area so as to correspond to the relative positions in order of the imaging areas. For this reason, it is possible to sequentially visually grasp detection situations of the positional relationships among the respective articles.

First Embodiment

A first embodiment of a positional relationship detection device and a positional relationship detection system according to the present disclosure will be described with reference to the drawings.

A mobile terminal 10 shown in FIG. 1 is configured as a positional relationship detection device that detects positional relationships among a plurality of types of articles displayed in a display shelf 1 using information codes. In addition, a positional relationship detection system 3 shown in FIG. 1 includes the mobile terminal 10 and a server 4. The positional relationship detection system 3 is configured as a system that detects the positional relationships among the plurality of types of articles displayed in the display shelf 1 using the mobile terminal 10. In the present embodiment, the positional relationships among respective goods displayed on the display shelf 1 as shown in FIG. 1 are detection targets. The display shelf 1 is divided vertically by three shelf boards 2a to 2c, and becomes longer horizontally along an aisle. The good may be referred to as an item, a product, and an article.

A cooking sheet as goods G1, a frying pan foil as goods G2, an aluminum foil as goods G3, a plastic container as goods G4, a freezer bag (large) as goods G5, and a freezer bag (medium) as goods G6, a freezer bag (small) as goods G7, a wrap film as goods G8, and a plastic bag as goods G9 are displayed in the display shelf 1.

Information codes C1 to C9 in which specific information capable of specifying types of articles are recorded are arranged by using the respective shelf boards 2a to 2c, in a prescribed size for each position at which the respective goods G1 to G9 are displayed, respectively. Specifically, the information code C1 in which specific information capable of specifying the cooking sheet as a type of the goods G1 is recorded is arranged on a left side of a label attaching portion provided on a front surface of the shelf board 2a and in the vicinity of the center of a range in which various cooking sheets are displayed. In addition, the information code C2 in which specific information capable of specifying the frying pan foil as a type of the goods G2 is recorded is arranged on a central left side of the label attaching portion provided on the front surface of the shelf board 2a and in the vicinity of the center of a range in which various frying pan foils are displayed. In addition, the information code C3 in which specific information capable of specifying the aluminum foil as a type of the goods G3 is recorded is arranged on a central right side of the label attaching portion provided on the front surface of the shelf board 2a and in the vicinity of the center of a range in which various aluminum foils are displayed. In addition, the information code C4 in which specific information capable of specifying the plastic container as a type of the goods G4 is recorded is arranged on a right side of the label attaching portion provided on the front surface of the shelf board 2a and in the vicinity of the center of a range in which various plastic containers are displayed. In addition, the information code C5 in which specific information capable of specifying the freezer bag (large) as a type of the goods G5 is recorded is arranged on a left side of a label attaching portion provided on a front surface of the shelf board 2b and in the vicinity of the center of a range in which various freezer bags (large) are displayed. In addition, the information code C6 in which specific information capable of specifying the freezer bag (medium) as a type of the goods G6 is recorded is arranged at the center of the label attaching portion provided on the front surface of the shelf board 2b and in the vicinity of the center of a range in which various freezer bags (medium) are displayed. In addition, the information code C7 in which specific information capable of specifying the freezer bag (small) as a type of the goods G7 is recorded is arranged on a right side of a label attaching portion provided on a front surface of the shelf board 2b and in the vicinity of the center of a range in which various freezer bags (small) are displayed. In addition, the information code C8 in which specific information capable of specifying the wrap film as a type of the goods G8 is recorded is arranged on a left side of a label attaching portion provided on a front surface of the shelf board 2c and in the vicinity of the center of a range in which various wrap films are displayed. In addition, the information code C9 in which specific information capable of specifying the plastic bag as a type of the goods G9 is recorded is arranged on a right side of the label attaching portion provided on the front surface of the shelf board 2c and in the vicinity of the center of a range in which various plastic bags are displayed. The respective information codes C1 to C9 are OR codes (registered trademark) having three position detection patterns, and are formed in a square so as to have the same code size.

In the present embodiment, a guide code Cg is arranged as an information code using a OR code different from the respective information codes C1 to C9, in the display shelf 1. Specifically, the guide code Cg is arranged in the vicinity of a right end of the shelf board 2a in a direction (hereinafter, also referred to as a right opposite direction) in which an arrangement direction of a position detection pattern FP1 and a position detection pattern FP2 is along an X direction and an arrangement direction of the position detection pattern FP1 and a position detection pattern FP3 is along a Y direction, based on the position detection pattern FP1 that does not have a position detection pattern on a diagonal as shown in FIG. 2A on an XY plane where a longitudinal direction (also referred to as a horizontal direction, a right-and-heft direction) of the display shelf 1 is the X direction and a vertical direction of the display shelf 1 is the Y direction.

A configuration of the server 4 according to the present embodiment will be described with reference to the drawings.

The server 4 includes a storage portion 6, a display portion 7, and a communication portion 8, and a controller 5 that generally controls the storage portion 6, the display portion 7, and the communication portion 8, as illustrated in FIG. 1. The controller 5 is composed mainly of a microcontroller, has a central processing unit (CPU), a system bus, an input/output interface, and the like, and functions as an information processing device together with the storage portion 6. The storage portion 6 is configured by a semiconductor memory or the like such as a read only memory (ROM), a random access memory (RAM), or a nonvolatile memory. In the storage portion 6, predetermined application programs, databases, or the like are stored in advance so that they can be used by the controller 5. The display portion 7 is configured as, for example, a liquid crystal monitor or the like, and is configured so that a display content of the display portion 7 is controlled by the controller 5. The communication portion 8 is controlled by the controller 5, and is configured to communicate with an external device such as the mobile terminal 10 through a predetermined network such as the Internet.

A configuration of the mobile terminal 10 according to the present embodiment will be described with reference to the drawings.

The mobile terminal 10 is configured as a portable information terminal such as a tablet terminal or a smartphone carried by a worker (also referred to as a staff) who confirms a display state or the like of the display shelf 1. This mobile terminal 10 includes an imaging portion, a display portion, and the like, and is configured by installing a predetermined application program (hereinafter also referred to as a positional relationship detection application) for displaying positional relationships or the like among the respective goods displayed on the display shelf 1 on a screen by using a read result of imaged information codes.

Figure 3:
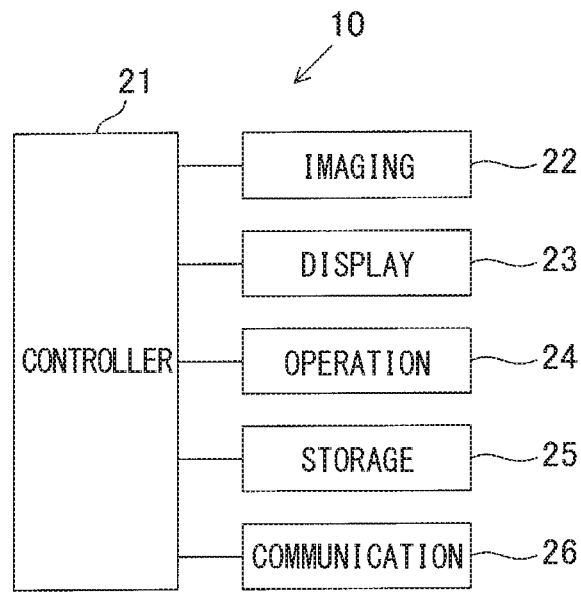
FIG. 3 is a block diagram schematically illustrating an electrical configuration of the mobile terminal.

The mobile terminal 10 includes a controller 21 composed of a CPU, an imaging portion 22 configured as a camera capable of capturing a rectangular captured image by two-dimensionally arranging light receiving sensors (for example, complementary metal oxide semiconductor (CMOS) area sensors, charge coupled device (CCD) area sensors or the like), a display portion 23 including a liquid crystal display or the like, an operation portion 24 configured by various operation keys, a touch panel, or the like (not shown), a storage portion 25 composed of a ROM, a RAM, a nonvolatile memory, and the like, and a communication portion 26 configured as a communication interface capable of communicating with an external device such as the server 4 in a wireless or wired manner through a predetermined network such as the Internet, and the like, as shown in FIG. 3.

The controller 21 functions as a reading part (also referred to as a reading section) that reads information recorded in an information code by performing decoding processing on image data of the information code imaged by the imaging portion 22. In addition, the display portion 23 is controlled by the controller 21, and functions as a display unit capable of displaying a first display area 23b and a second display area 23c or predetermined information on a display screen 23a.

The mobile terminal 10 displays information indicating positional relationships among the respective goods G1 to G9 on the display screen 23a of the display portion 23 by using relative position information (relative XY coordinate information) or the like of the respective information codes C1 to C9 obtained by imaging the respective information codes C1 to C9 and the guide code Cg and reading results of the respective information codes C1 to C9 by positional relationship detection processing performed by the controller 21.

Figure 2B:
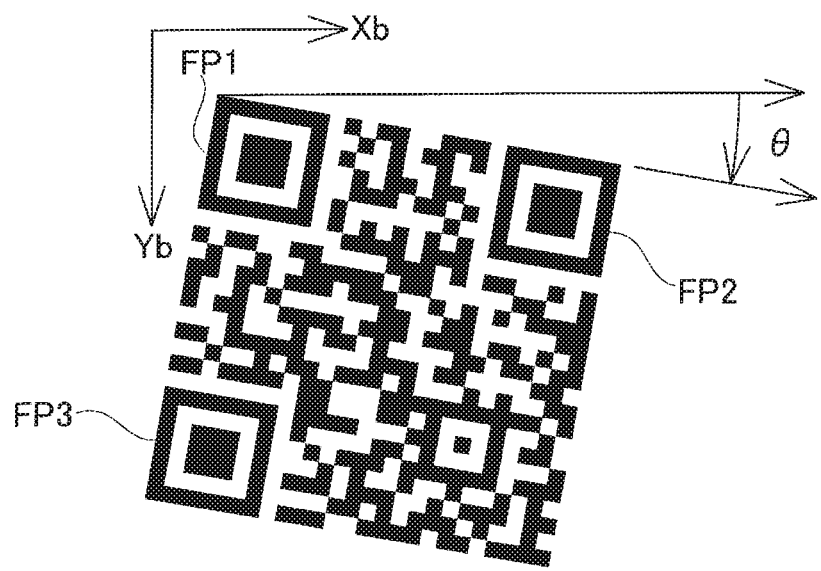
FIG. 2B is an explanatory diagram for describing a rotation angle of an information code detected in a rectangular captured image.

In particular, in the present embodiment, at the time of imaging the information codes C1 to C9, in order to eliminate an influence of a change in an inclination of the mobile terminal 10 with respect to the display shelf 1, the relative position information of the respective information codes C1 to C9 is detected by performing rotational projective transformation or the like on the captured image in response to detected rotation angles θ of the information codes. The rotation angle θ is detected as an angle between an arrangement direction of the position detection pattern FP1 and the position detection pattern FP2 and an Xb direction in a rectangular captured image in which a horizontal direction is the Xb direction and a vertical direction is an Yb direction, as shown in FIG. 2B.

Figure 4:
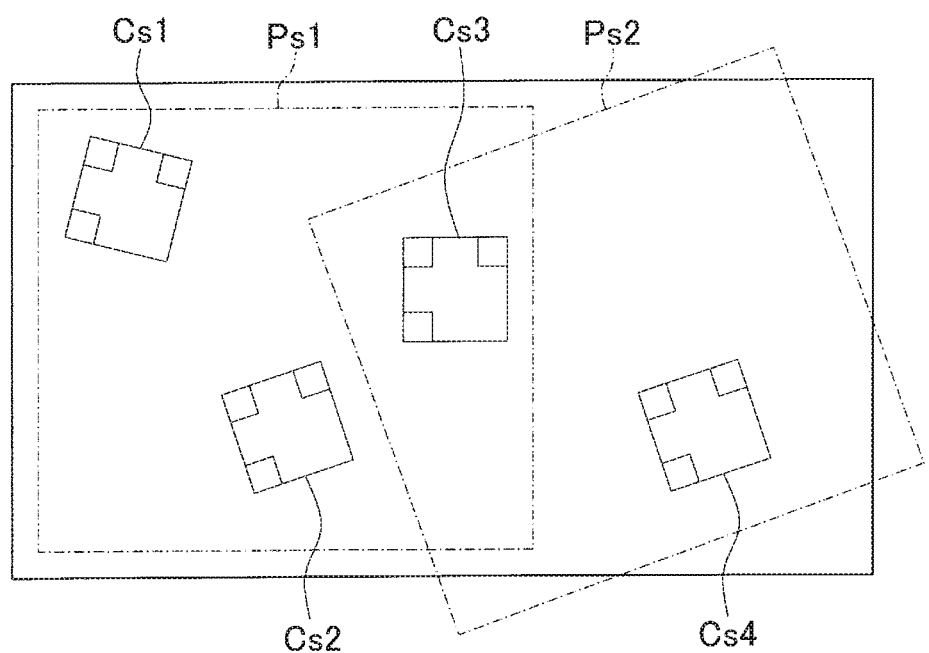
FIG. 4 is an explanatory diagram for describing a relationship between an arrangement state of four information codes and two imaging areas.
Figure 5A:
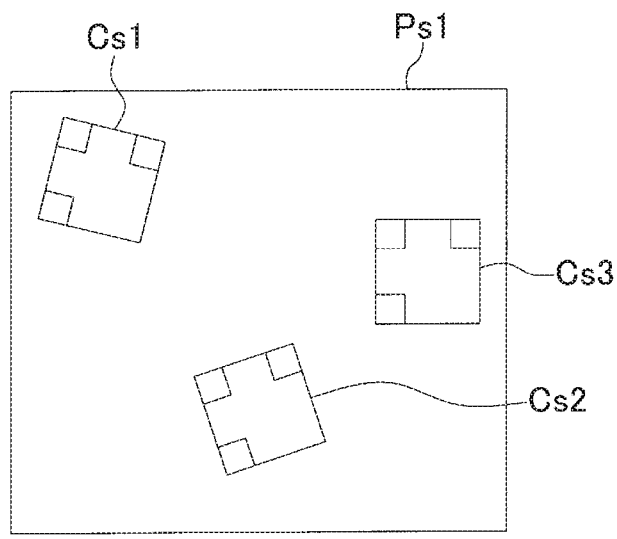
FIG. 5A is an explanatory diagram for describing a captured image of an imaging area Ps1 in FIG. 4.
Figure 5B:
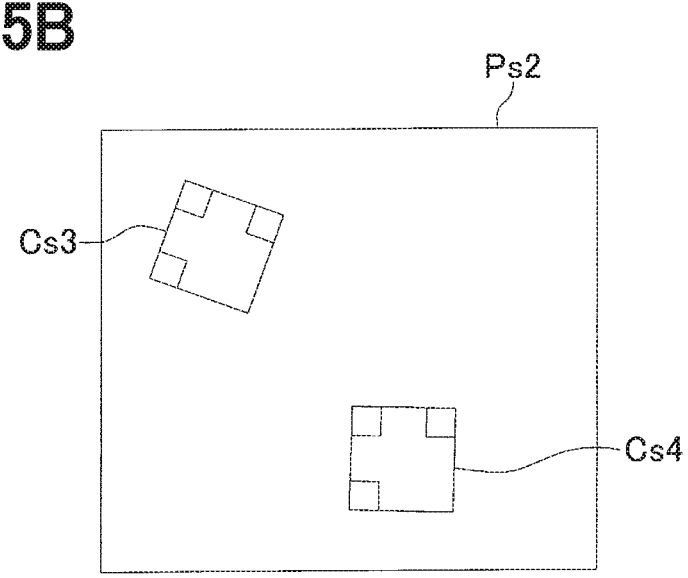
FIG. 5B is an explanatory diagram for describing a captured image of an imaging area Ps2 in FIG. 4.
Figure 6:
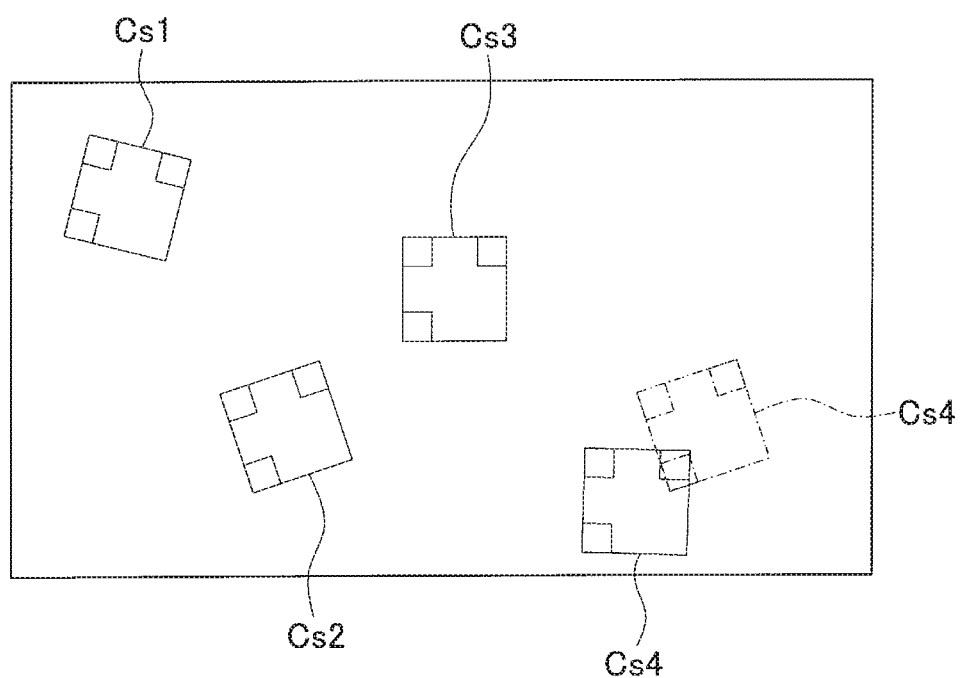
FIG. 6 is an explanatory diagram for describing a relationship between relative position information of an information code Cs4 detected without performing rotational projective transformation with respect to FIG. 5B and relative position information of the information code Cs4 detected by performing the rotational projective transformation.

For example, at the time of detecting relative positional relationships among four information codes Cs1 to Cs4 arranged as shown in FIG. 4, there is a case where an imaging area Ps2 of a captured image (see FIG. 5B) obtained by subsequently imaging the information codes Cs3 and Cs4 is inclined with respect to an imaging area Ps1 of a captured image (see FIG. 5A) obtained by imaging the information codes Cs1, Cs2, and Cs3. In such an imaging state, when relative position information of the information code Cs4 is detected on the basis of relative position information of the information code Cs3 in the captured image of the imaging area Ps2 without performing the rotational projective transformation or the like on the captured image in response to the detected rotation angle θ, the relative position information of the information code Cs4 is erroneously detected, as seen from FIG. 6. In FIG. 6, the information code Cs4 based on the erroneously detected relative position information is shown by a solid line, and the information code Cs4 based on correct relative position information is shown by a one-dot chain line.

Rotation angles θ of two or more information codes imaged first are detected together with relative position information, and are stored in the storage portion 25. Whenever an information code is newly imaged, rotational projective transformation or the like (hereinafter simply referred to as rotational projective transformation) is performed on the captured image of the information code so that a shape of a read information code is a square shape having a predetermined size and a rotation angle θ of the read information code coincides with the rotation angle θ stored in the storage portion 25. The relative position information and the rotation angles θ of the respective information codes are detected. In an example of FIG. 5B, after the rotational projective transformation is performed on the captured image of the imaging area Ps2 so that the rotation angle θ of the information code Cs3, which is the read information code, coincides with the rotation angle θ stored in the storage portion 25, relative position information and a rotation angle θ of the information code Cs4 based on the information code Cs3 are detected and stored in the storage portion 25.

The relative position information and the rotation angle θ detected and stored in the storage portion 25 are updated on the basis of the detected rotation angle θ or the like of the guide code Cg. The reason why the relative position information and the rotation angle θ stored in the storage portion 25 are updated on the basis of the rotation angle θ or the like of the guide code Cg will be described below.

In many cases, the respective information codes C1 to C9, which are detection targets, are arranged with the rotation angle θ varied due to an influence of a display state of the display shelf 1. In addition, there is a case where a captured image obtained by first imaging two or more information codes may be captured in a state where the X direction and the Xb direction do not coincide with each other. In such a case, when a rotation angle that is actually arranged, that is, an angle between the arrangement direction of the position detection pattern FP1 and the position detection pattern FP2 and the longitudinal direction (X direction) of the display shelf 1 is an actual rotation angle, the rotation angle θ that is first stored in the storage portion 25 to become a reference in the rotational projective transformation is different from the actual rotation angle. When the rotational projective transformation is performed based on the rotation angle θ different from the actual rotation angle as such, a case occurs where the rotation angle θ of the information code may be detected and stored to be different from the actual rotation angle.

Therefore, in the present embodiment, when the guide code Cg is imaged, the relative position information and the rotation angle θ stored so far in the storage portion 25 are updated using the rotational projective transformation in which the rotation angle θ of the guide code Cg becomes a prescribed angle (0° in the present embodiment). This is because the guide code Cg is arranged so that an actual rotation angle of the guide code Cg becomes the prescribed angle, and prescribed arrangement information indicating that the guide code Cg is an information code arranged so that the rotation angle θ with respect to the shelf board becomes a prescribed angle is recorded in the guide code Cg.

Specifically, in a case where the rotation angle θ of the guide code Cg is detected, a virtual plane in which the respective information codes are virtually arranged in response to the relative position information and the rotation angles θ stored in the storage portion 25 until the detection of the rotation angle θ of the guide code Cg is subjected to rotational-projective transformation to be corrected so that the detected rotation angle θ of the guide code Cg becomes the prescribed angle, and the relative position information and the rotation angles θ stored in the storage portion 25 are updated in response to the relative position information and the rotation angles θ of the respective information codes virtually arranged on the virtual plane after being corrected.

Figure 7A:
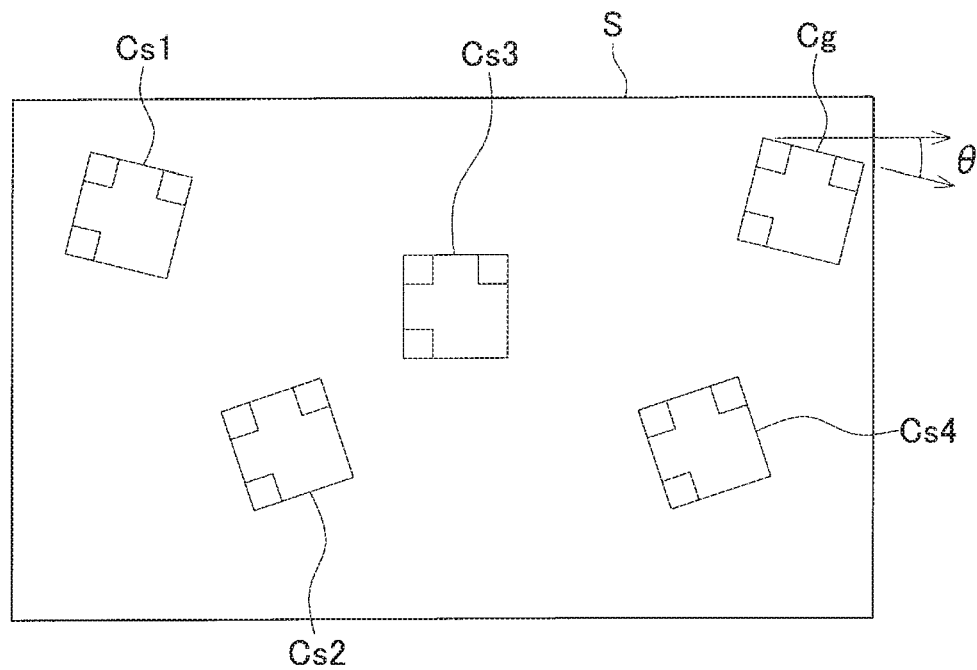
FIG. 7A is an explanatory diagram for describing a virtual plane before rotational projective transformation.
Figure 7B:
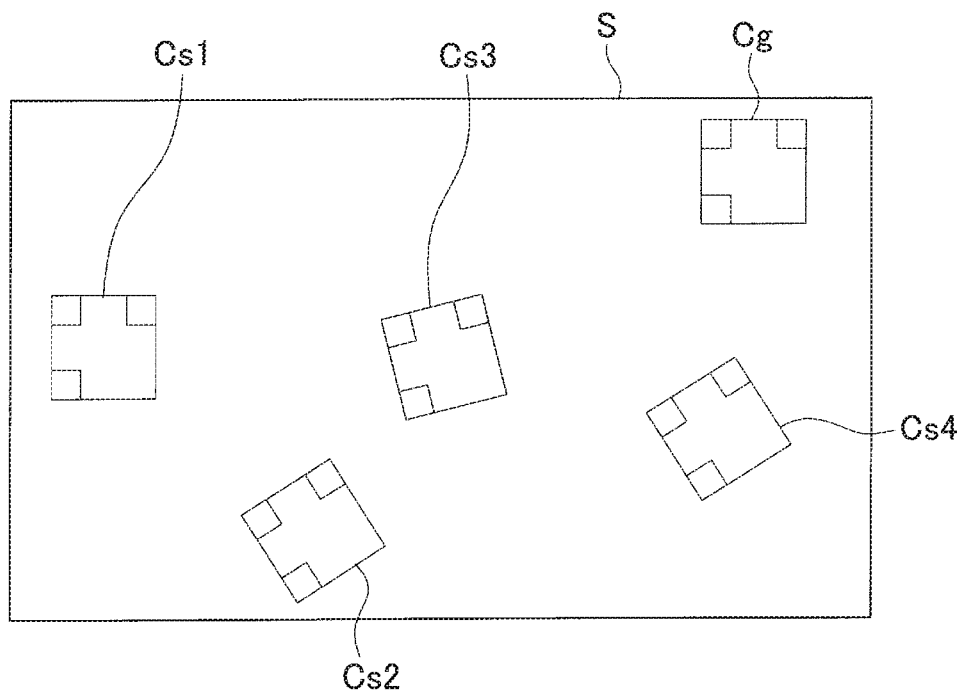
FIG. 7B is an explanatory diagram for describing a virtual plane after the rotational projective transformation.

For example, when the relative position information and the rotation angles θ of the information codes Cs1 to Cs4 are stored in the storage portion 25 until the detection of the rotation angle θ of the guide code Cg, a virtual plane S in which the respective information codes Cs1 to Cs4 and the guide code Cg are virtually arranged is obtained on the basis of these information as shown in FIG. 7A. As shown in FIG. 7B, the virtual plane S is subjected to rotational projective transformation to be corrected so that the detected rotation angle θ of the guide code Cg becomes a prescribed angle. In the virtual plane S corrected as such, the rotation angles θ of the respective information codes Cs1 to Cs4 coincide with the actual rotation angles. It is possible to update the relative position information and the rotation angle θ stored in the storage portion 25 in response to the relative position information and the rotation angles θ of the respective information codes Cs1 to Cs4 virtually arranged on the virtual plane S after being corrected.

Hereinafter, positional relationship detection processing executed by the controller 21 of the mobile terminal 10 at the time of detecting the positional relationships among the goods G1 to G9 displayed in the display shelf 1 using the mobile terminal 10 will be described with reference to a flowchart shown in FIG. 8, or the like.

Figure 8:
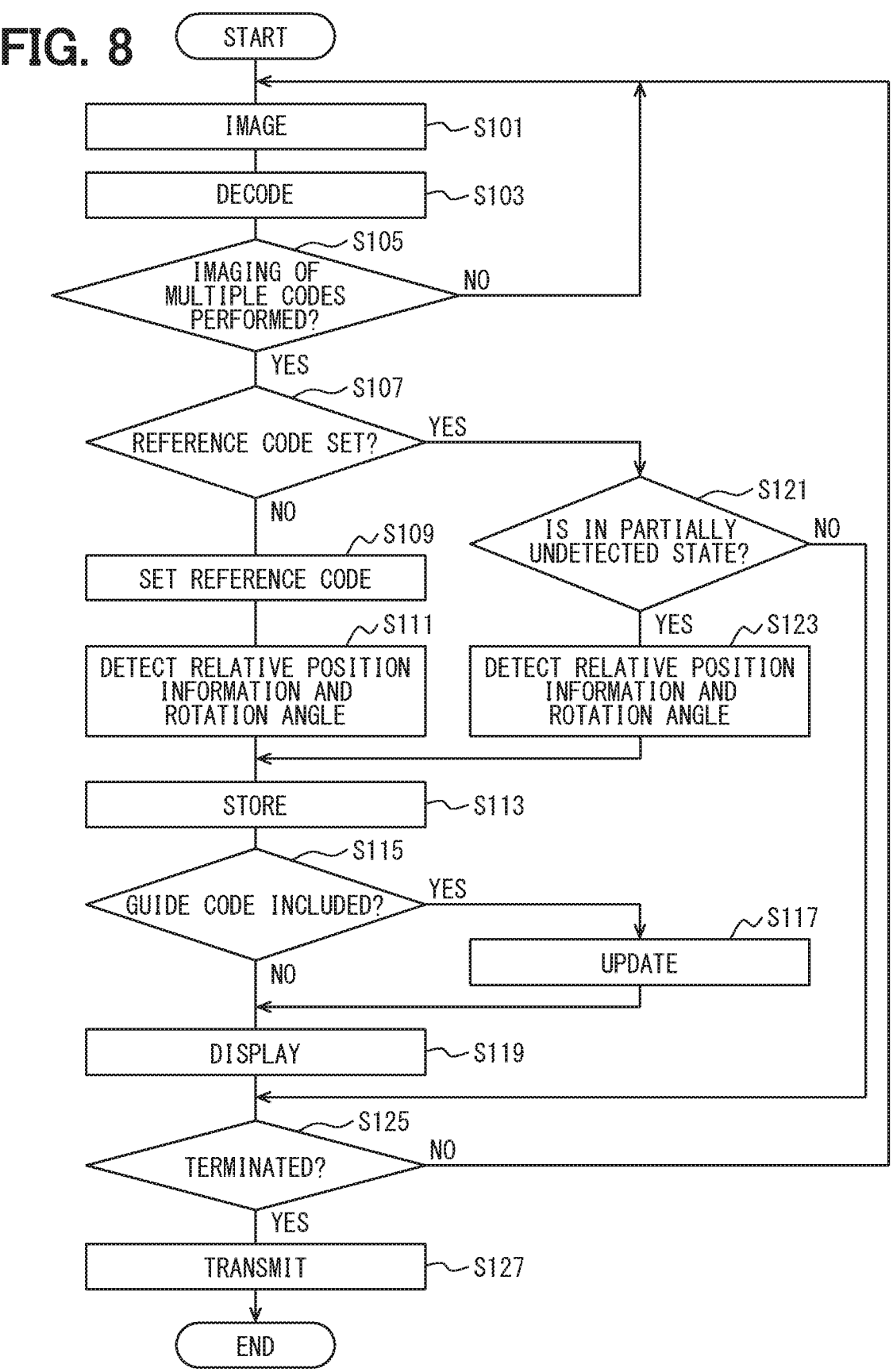
FIG. 8 is a flowchart illustrating a flow of positional relationship detection processing performed by a controller in the first embodiment.

When the positional relationship detection processing starts by the controller 21 by starting the positional relationship detection application in response to a predetermined operation on the operation portion 24 by a user, imaging processing shown in S101 of FIG. 8 is first performed. A captured image captured by the imaging portion 22 is acquired. Then, decoding processing shown in S103 is performed. Processing for decoding an information code included in the captured image by a decoding method is performed.

Determination processing shown in S105 is performed. It is determined whether imaging of a plurality of codes where two or more information codes in which specific information is recorded are included in one captured image is performed. Here, in a case where an information code in which specific information is recorded is not included in one captured image or one information code in which specific information is recorded is included in one captured image, the imaging of the plurality of codes is not performed. A determination is made to be No in S105, and processing from S101 is performed.

When the user directs an imaging area of the imaging portion 22 to the display shelf 1 to allow the two or more information codes in which the specific information is recorded to be included in one captured image, the imaging of the plurality of codes is performed (Yes in S105). It is determined whether a reference code is set in determination processing of S107. Here, the reference code is set to one of the two or more information codes captured first. When the two or more information codes in which the specific information is recorded are included in one captured image for the first time this time, a determination is made to be No in S107. Then, one of the two or more information codes captured first is set as the reference code by reference code setting processing of S109. For example, when the information codes C1, 05, and 08 are first imaged by imaging an imaging area P1 in FIG. 1, the information code C1 first read by being positioned on an upper left side of a captured image is set as the reference code.

Relative position information and rotation angle detection processing shown in S111 is performed. In this processing, for each information code transformed into a reference plane so that a shape of the reference code becomes a square shape having a predetermined size using projective transformation or the like based on a shape of the imaged information code, relative position information with respect to the reference code is detected on the basis of a size (a length of one side) of the reference code. Further, in this processing, a rotation angle θ of each information code on the reference plane is detected.

For example, when the imaging area P1 shown in FIG. 1 is imaged, after transformation into the reference plane, relative position information of the information code C5 is detected as (26, 25) and relative position information of the information code C8 is detected as (29, 46), based on a size of the information code C1 set as the reference code. In addition, a rotation angle θ of the information code C1 is detected as 10°. A rotation angle θ of the information code C5 is detected as 35°. A rotation angle θ of the information code C8 is detected as −10°. As such, since the relative position information is detected based on the size of the information code after the transformation into the reference plane, it is possible to detect the relative position information of each information code without needing to record position information in advance in each information code. The relative position information may be detected so that a length of one side of the information code is a predetermined value, based on the size of the information code or the length may be detected in units of "cm". The controller 21 performing the relative position information and rotation angle detection processing of S111 and relative position information and rotation angle detection processing of S123 as described later may correspond to an example of a detection portion (also referred to as a detection section) that can detect relative position information and rotation angles θ for two or more information codes.

When the relative position information and the rotation angle θ are detected for each information code, storing processing shown in S113 is performed. Specific information or the like of information codes whose relative position information and rotation angles θ are detected are stored together with the relative position information and the rotation angles θ as detection results of detected codes in the storage portion 25. When the information codes C1, C5, and 08 are imaged, specific information of the respective information codes C1 C5, and C8 is stored together with relative position information and rotation angles θ in the storage portion 25, as shown in FIG. 9A.

In determination processing of S115, it is determined whether the guide code Cg is included in an information code read this time. In a case where the guide code Cg is not included in the information code (No in S115), display processing shown in S119 is performed. In this processing, in the first display area 23b of the display screen 23a, type names indicating types of goods each specified from the respective detected codes stored in the storage portion 25 are each displayed in response to the relative position information. Further, in the second display area 23c of the display screen 23a, a current captured image captured by the imaging portion 22 is displayed.

Figure 11:
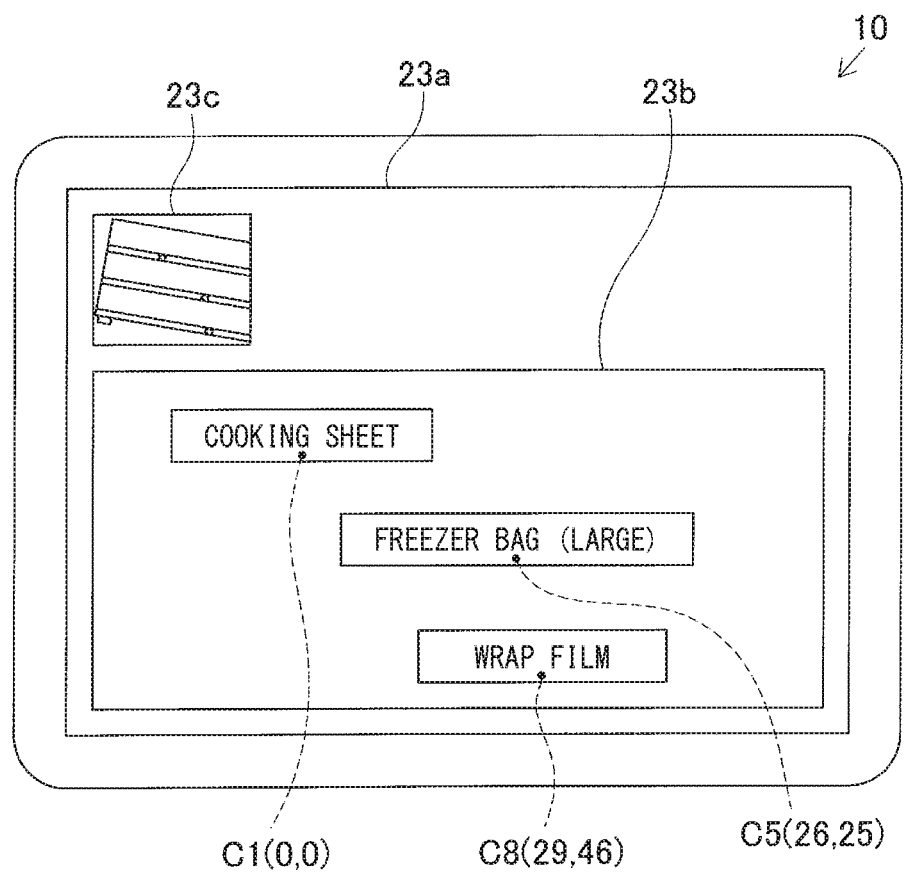
FIG. 11 is an explanatory diagram for describing a display state of a first display area in the storage state of FIG. 9A.

For example, in a case where specific information or the like of the detected codes is stored in the storage portion 25 as shown in FIG. 9A, as shown in FIG. 11, in the first display area 23b, a type name "cooking sheet" of the goods G1 specified from the specific information of the information code C1 is displayed so that the center of the information code C1 is a lower end center. Similarly, in the first display area 23b, a type name "freezer bag (large)" of the goods G5 specified from the specific information of the information code C5 is displayed so that the center of the information code C5 is a lower end center. A type name "wrap film" of the goods G8 specified from the specific information of the information code C8 is displayed so that the center of the information code C8 is a lower end center. In the first display area 23b, enlarged/reduced display may be performed in response to a predetermined operation.

In a case where a predetermined termination operation or the like is not performed (No in S125), processing from S101 is performed again in the display state as described above, such that a current state becomes a state where another information code can be imaged. When the imaging of the plurality of codes is performed (Yes in S105) where two or more information codes in which specific information is recorded are included in one captured image captured subsequently and the reference code has already been set (Yes in S107), determination processing shown in S121 is performed. In this determination processing, when an information code whose specific information is not stored in the storage portion 25 is an undetected code, it is determined whether a captured image is in a state (hereinafter also referred to as a partially undetected state) where some of the two or more information codes included in one captured image are detected codes and the others are undetected codes.

When all of the two or more information codes included in one captured image are the detected codes, it is considered that the captured image is not in the partially undetected state (No in S121), and determination processing of S125 is performed. In addition, even though all of the two or more information codes included in one captured image are the undetected codes, it is considered that the captured image is not in the partially undetected state (No in S121), and determination processing of S125 is performed.

When the user moves the mobile terminal 10 so that the imaging area by the imaging portion 22 is changed from the imaging area P1 to an imaging area P2 in FIG. 1, such that the information code C2 that is the undetected code and the information codes C5 and C8 that are the detected codes are included in one captured image, it is considered that the captured image is in the partially undetected state, such that a determination is made to be Yes in S121.

In this case, relative position information and rotation angle detection processing shown in S123 is performed. In this processing, after rotational projective transformation is performed on the captured image so that a shape of one detected code is a square shape having a predetermined size and a rotation angle θ of the detected code coincides with the rotation angle stored in the storage portion 25, relative position information of the undetected code after the transformation with respect to the detected code is detected based on the size of the detected code. Further, in this processing, the rotation angle θ of the undetected code after the transformation is detected. The controller 21 performing the determination processing of S121 may correspond to an example of a determination portion (also referred to as a determination section) of the present disclosure.

In an imaging state in the imaging area P2 shown in FIG. 1, after the rotational projective transformation is performed based on any one (for example, the information code C5) of the detected codes, relative position information of the information code C2 is detected as (71, 13) and a rotation angle θ of the information code C2 is detected as 5°. As such, since the transformation is performed so that the shape of the detected code is the square shape having the predetermined size, even in a case where a size of the range imaged in the imaging area P1 in FIG. 1 is different from that of a range imaged in the imaging area P2, a relative position of the undetected code with respect to the detected code can be accurately detected.

When the relative position information and the rotation angle θ for the undetected code are detected, in the storing processing of S113, specific information of the undetected code whose relative position information and rotation angle θ are detected are stored in the storage portion 25 so as to be added together with the relative position information and the rotation angle θ as specified information of the detected code. In a case where the information code C2 is imaged, the specific information of the information code C2 is stored in the storage portion 25 so as to be added together with the relative position information and the rotation angle θ as shown in FIG. 9B.

In a case where the guide code Cg is not included in the information code read this time (No in S115), in the display processing of S119, a type name indicating a type of goods specified from this added detected code is displayed in the first display area 23b of the display screen 23a so as to be added in response to the relative position information of the detected code.

Figure 12:
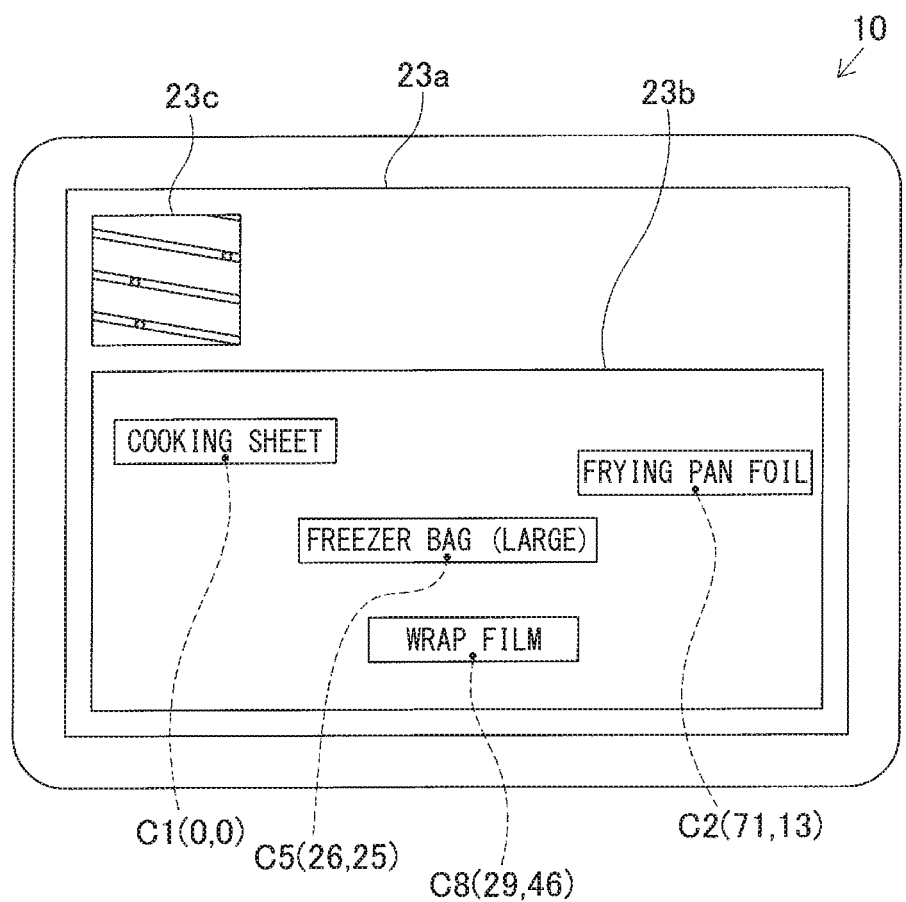
FIG. 12 is an explanatory diagram for describing a display state of the first display area in the storage state of FIG. 9B.

For example, in a case where specific information or the like of the detected codes is stored in the storage portion 25 as shown in FIG. 9B, as shown in FIG. 12, in the first display area 23b, a type name "frying pan foil" of the goods G2 specified from the specific information of the information code C2 is additionally displayed so that the center of the information code C2 is a lower end center. In other words, by moving the imaging area by the imaging portion 22, the relative positional relationships among the respective information codes imaged so far are detected in real time and displayed in the first display area 23b in response to the movement of the imaging area. Then, in a case where a predetermined termination operation or the like is not performed (No in S125), the processing from S101 is performed again in the display state as described above.

The user moves the mobile terminal 10 so as to image the information code C4 arranged on the rightmost side in the display shelf 1 among the respective information codes C1 to C9. Relative position information and a rotation angle θ of the information code C4 are detected. Therefore, as shown in FIG. 9C, specific information of all the information codes C1 to C9 is stored in the storage portion 25 so as to be added together with relative position information and rotation angles θ.

When the user moves the mobile terminal 10 until the imaging area by the imaging portion 22 becomes an imaging area P3 in FIG. 1. When the guide code Cg is read, a determination is made to be Yes in S115. Update processing of S117 is performed. In this processing, the virtual plane S in which the respective information codes in which the specific information and the like are stored and the guide code Cg are virtually arranged is corrected by the rotational projective transformation in which the rotation angle θ of the guide code Cg becomes the prescribed angle, and the relative position information and the rotation angles θ stored in the storage portion 25 are updated in response to the relative position information and the rotation angles θ of the respective information codes virtually arranged on the virtual plane S after being corrected.

When the specific information or the like of the detected codes shown in FIG. 9C is stored in the storage portion 25, the relative position information and the rotation angles θ of the respective information codes stored in the storage portion 25 are updated as shown in FIG. 10 in response to the relative position information and the rotation angles θ of the respective information codes virtually arranged on the virtual plane S after being corrected. Thus, it is possible to update the relative position information so that the rotation angle θ coincides with the actual rotation angle. The controller 21 performing the update processing of S117 may correspond to an example of an update portion (also referred to as an update section). The update portion can update the relative position information and the rotation angles θ in response to an imaging state of the guide code Cg. In addition, in the determination processing of S115, a determination is made to be No thereafter when the update processing is performed once using a flag indicating whether the update processing in S117 is performed, such that the update processing is not performed plural times, and a processing time may thus be shortened.

Figure 13:
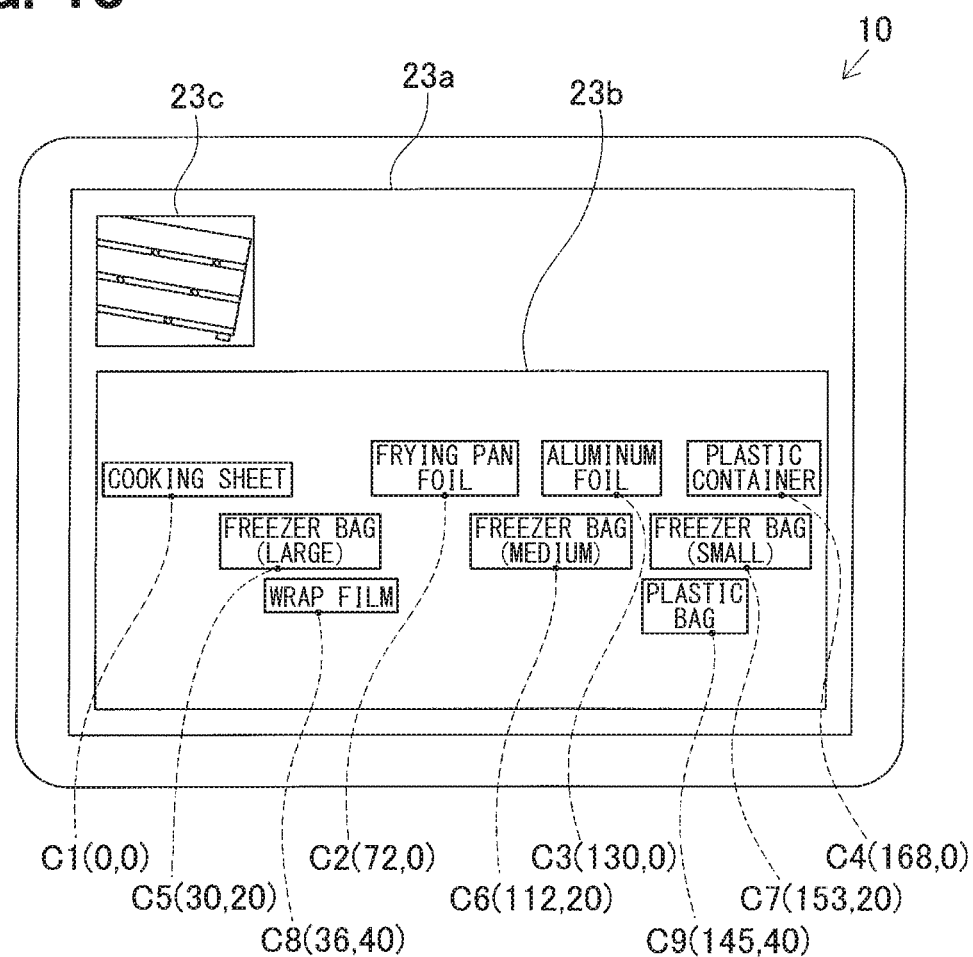
FIG. 13 is an explanatory diagram for describing a display state of the first display area in the storage state of FIG. 9C.

In the display processing of S119 performed after the relative position information and the rotation angles θ are updated, type names indicating the types of goods are displayed in the first display area 23b of the display screen 23a in response to the updated relative position information, for all the information codes read so far, as shown in FIG. 13. Then, when a termination operation or the like is performed by the user (Yes in S125), information on the relative positional relationships among the respective information codes detected as such is transmitted as data for grasping the positional relationships among the respective goods displayed in the display shelf 1 to the server 4 through the communication portion 26 (S127), and the present positional relationship detection processing terminates.

In the server 4, in management processing performed by the controller 5, when the information transmitted from the mobile terminal 10 is received through the communication portion 8, processing for managing the positional relationships among the respective articles displayed in the display shelf 1 is performed using this reception result. The controller 5 may correspond to an example of a management portion. The communication portion 8 may correspond to an example of a reception portion. The communication portion 26 may correspond to an example of a transmission portion.

An example of a case has been described in the above description where the user moves the mobile terminal 10 until the imaging area by the imaging portion 22 is changed from the imaging area P1 to the imaging area P3 in FIG. 1. Even though the user moves the mobile terminal 10 so as to be different from the displacement of the imaging area as such, it is possible to detect the relative position information and the rotation angles θ of the respective information codes. For example, in a case where the user moves the mobile terminal 10 until the imaging area by the imaging portion 22 is changed from the imaging area P3 to the imaging area P1 in FIG. 1, the information code C3 first read by being imaged in the imaging area P3 is set as a reference code, and relative positions of the respective undetected codes or the like are detected based on this reference code.

Figure 14:
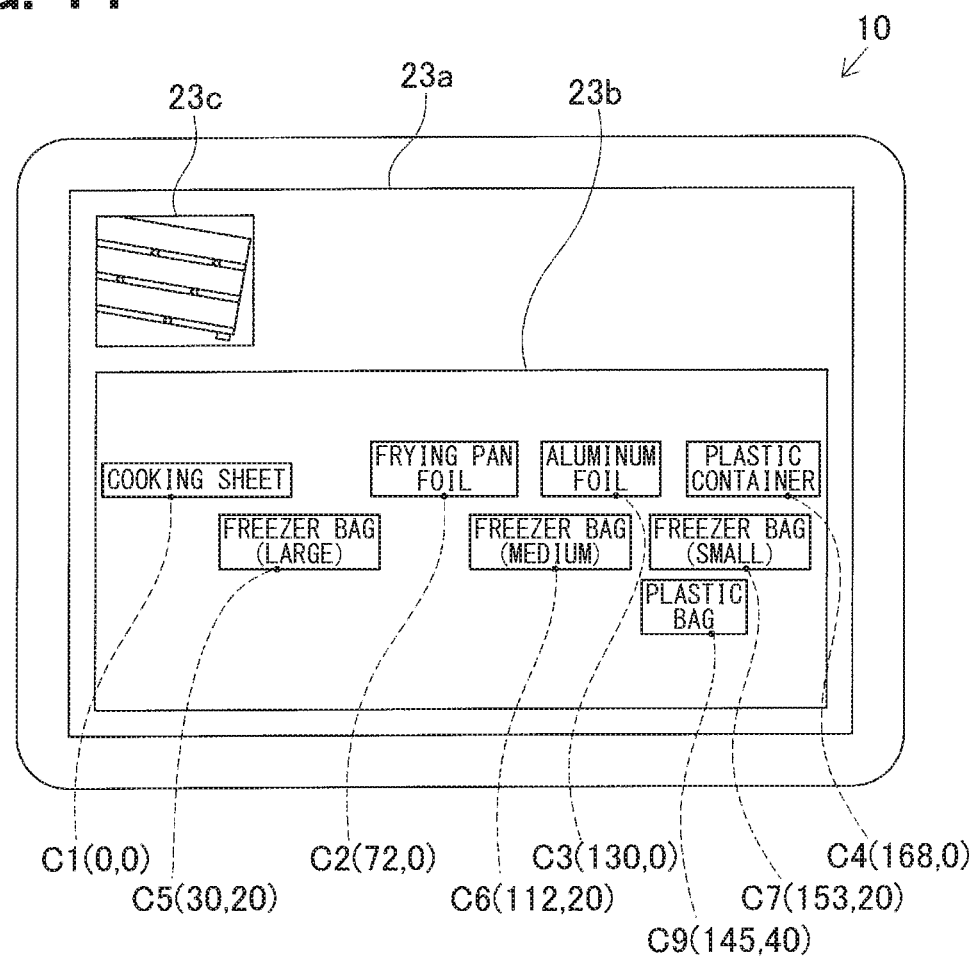
FIG. 14 is an explanatory diagram for describing a display state of the first display area in a state where only an information code C8 is skipped.

For example, in a case where the respective information codes excluding the information code C8 are read and the information code C8 is skipped, the type names of goods excluding the type name of goods G8 are displayed in the first display area 23b of the display screen 23a, as shown in FIG. 14. Since a display state becomes such a display state, the user can easily grasp that the information code C8 is skipped. In such a case, by imaging the skipped information code C8 and at least one other detected code in one captured image, it is possible to display the type names indicating the types of goods in the first display area 23b of the display screen 23a in response to the relative position information, for all the information codes C1 to C9, as shown in FIG. 13.

As described above, in the mobile terminal 10 according to the present embodiment, in the display shelf 1, the information codes C1 to C9 in which the specific information capable of specifying the types of articles is recorded are arranged, respectively, using the shelf boards 2a to 2c, for each position at which the respective types of articles are displayed, and the guide code Cg in which the prescribed arrangement information is recorded is arranged so that the rotation angle θ thereof is the prescribed angle. At the time of imaging of the plurality of codes in a state where the detected codes are not stored in the storage portion 25, the relative position information among the respective information codes and the rotation angles θ of the respective information codes are detected. In addition, for the captured image determined to be in the partially undetected state where the undetected code is included together with at least one detected code (Yes in S121), the rotation angle θ of one detected code is detected, and the relative position information and the rotation angle θ of the undetected code are detected after the rotational projective transformation is performed on the captured image. The detected rotation angle θ becomes the rotation angle θ stored in the storage portion 25 in relation to the detected code. In the case where the rotation angle θ of the guide code Cg is detected, the virtual plane S in which the respective information codes are virtually arranged in response to the relative position information and the rotation angles θ stored in the storage portion 25 until the detection of the rotation angle θ of the guide code Cg is subjected to rotational projective transformation to be corrected so that the detected rotation angle θ of the guide code Cg becomes the prescribed angle, and the relative position information and the rotation angles θ stored in the storage portion 25 are updated in response to the relative position information and the rotation angles θ of the respective information codes virtually arranged on the virtual plane S after being corrected (S117).

Thus, after the relative position information and the rotation angles θ of the two or more information codes first captured by the imaging portion 22 are detected, imaging is performed so as to move the imaging area by the imaging portion 22 along the longitudinal direction of the display shelf 1. When a new information code, that is, the undetected code, is imaged, the relative position information and the rotation angle θ of the undetected code are detected and stored as information of the detected code in the storage portion 25, Further, after the rotational projective transformation is performed on the captured image so that the rotation angle θ of the detected code becomes the rotation angle θ stored in the storage portion 25, the relative position information and the rotation angle θ of the undetected code are detected. Therefore, even in a case where the respective information codes are arranged at different rotation angles θ on the shelf boards, respectively, or even in a case where an inclination of the imaging portion 22 with respect to the display shelf 1 is changed for each imaging, it is possible to accurately detect the relative position information of the respective information codes. In particular, when the guide code Cg is detected, the relative position information and the rotation angles θ stored in the storage portion 25 are updated so that the rotation angle θ of the guide code Cg becomes the prescribed angle. Therefore, rotation angles θ suitable for actual arrangement states of the respective information codes with respect to the display shelf 1 can be detected. It is possible to more accurately detect the relative position information of the respective information codes. For this reason, after all the information codes are read, the positional relationships among the types of articles specified from the specific information of the detected code, that is, the positional relationships among the respective articles displayed in the display shelf 1 can be detected on the basis of the relative position information of the respective detected codes stored in the storage portion 25. Therefore, even though the respective articles are displayed in the display shelf 1 in which all the information codes arranged by using the shelf boards 2a to 2c are not imaged in one captured image, it is possible to detect the positional relationships among the respective articles.

Further, since all the information codes C1 to C9 are formed in the same size, sizes of other information codes need not be grasped by grasping a size of one information code (reference code). It is possible to reduce a detection processing load with respect to the detection of the relative positional relationship.

In particular, on the display screen 23a of the display portion 23, information indicating the types of articles each specified from the two or more detected codes stored in the storage portion 25 is displayed in the first display area 23b in response to the relative position information, and the current captured image captured by the imaging portion 22 is displayed in the second display area 23c. Thus, when the user moves the imaging area in the longitudinal direction of the display shelf 1 while viewing the current captured image displayed in the second display area 23c, the information indicating the types of articles displayed in the display shelf 1 is added to and displayed in the first display area 23b so as to correspond to the relative positions in order of the imaging areas (see FIGS. 11 to 13), For this reason, detection situations of the positional relationships among the respective articles can be sequentially grasped visually.

Information on the sizes of the information codes may be recorded, in addition to the specific information, in the information codes C1 to C9 arranged on the respective shelf boards 2a to 2c of the display shelf 1. In such a configuration, since the size of the information code for detecting the relative positional relationship can be accurately acquired by reading the information code, it is possible to detect the positional relationships among the respective articles with high accuracy. According to such a configuration, all of the respective information codes C1 to C9 are not limited to be formed in the same code size, and some of the information codes C1 to C9 may be formed in a different size.

Second Embodiment

A positional relationship detection device and a positional relationship detection system according to a second embodiment will be described with reference to the drawings.

The second embodiment is mainly different from the first embodiment in that two information codes indicating both ends of a display shelf 1 in a longitudinal direction (X direction) are additionally arranged. Therefore, components that are substantially the same as those in the first embodiment will be denoted by the same reference numerals, and a description thereof will be omitted.

Figure 15:
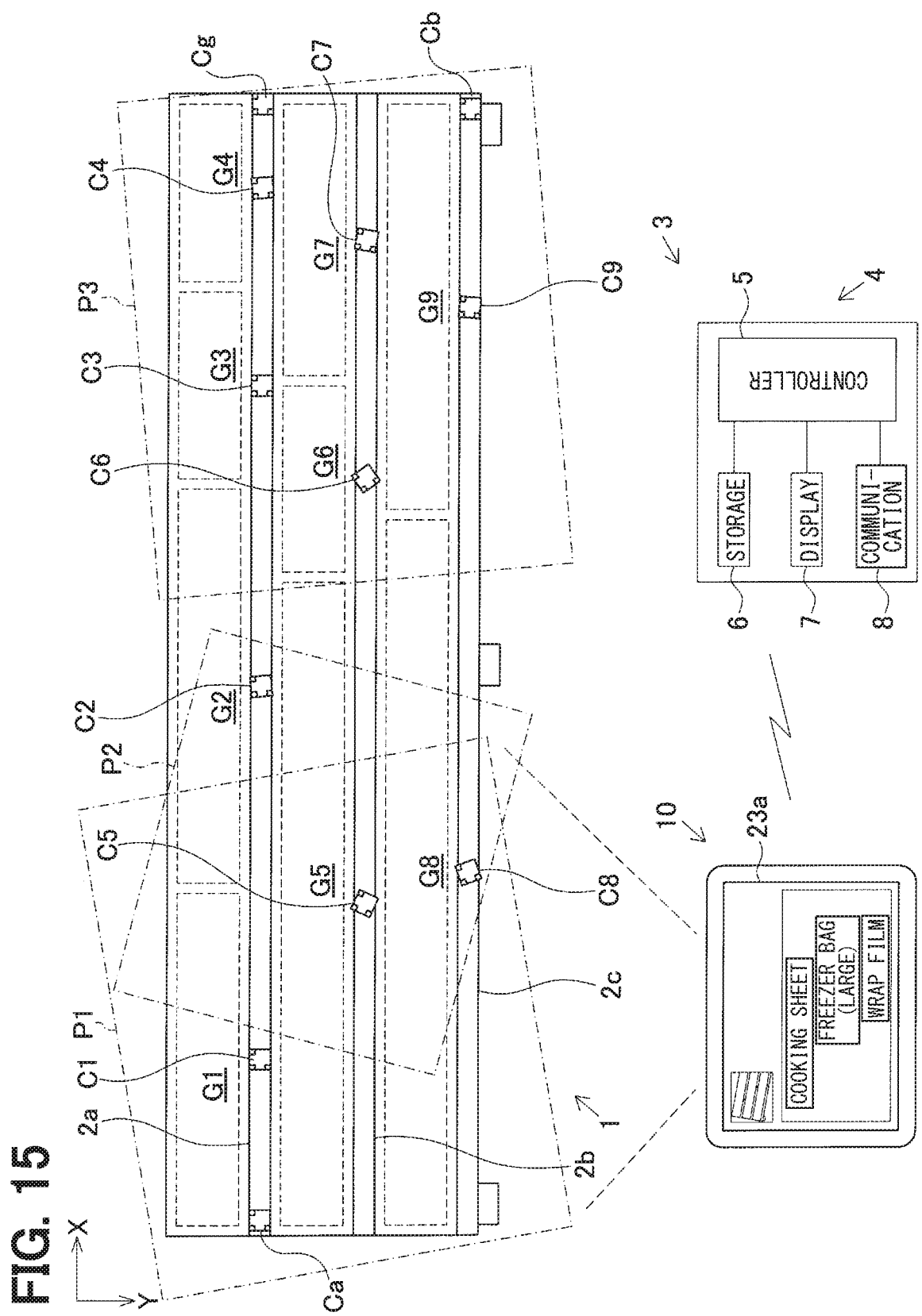
FIG. 15 is an explanatory diagram showing a mobile terminal, a positional relationship detection system, and a display shelf of a detection target according to a second embodiment.

In the present embodiment, as shown in FIG. 15, one end side code Ca is arranged as an information code in which one end side information indicating one end of the display shelf 1 in the longitudinal direction is recorded, on a portion of a shelf board 2a positioned at one end of the display shelf 1 in the longitudinal direction. In addition, the other end side code Cb is arranged as an information code in which the other end side information indicating the other end of the display shelf 1 in the longitudinal direction is recorded, on a portion of a shelf board 2c positioned at the other end of the display shelf 1 in the longitudinal direction. In addition, shelf information for specifying the display shelf 1 is included in one end side information and the other end side information. Since specific information is not recorded in one end side information and the other end side information so as to be stored in information codes C1 to C9, relative positional relationships of one end side code Ca and the other end side code Cb with respect to the other information codes C1 to C9 are not detected. The other end side code Cb may be referred to as a different end side code.

Figure 16:
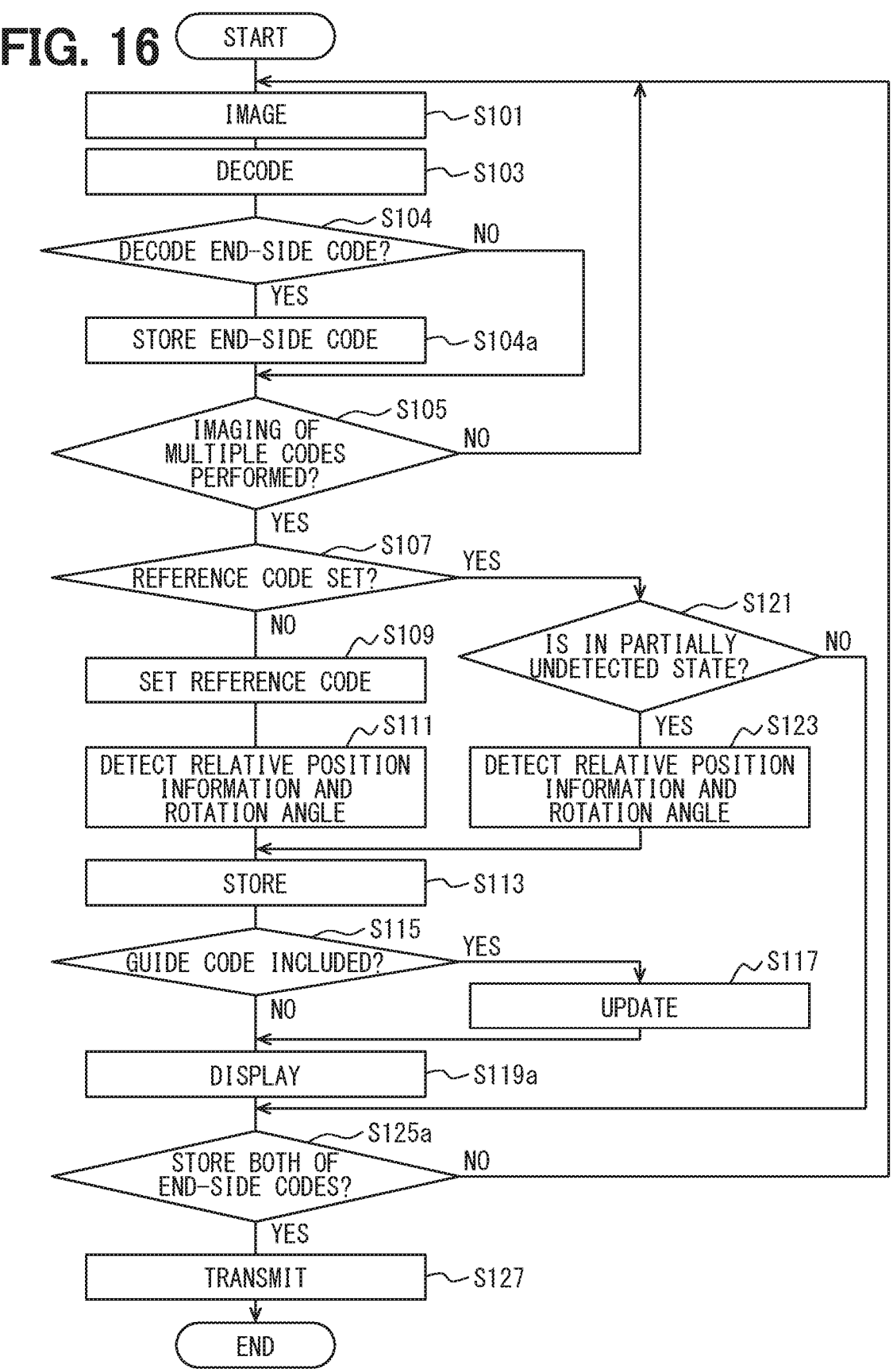
FIG. 16 is a flowchart illustrating a flow of positional relationship detection processing performed by a controller in the second embodiment.

In positional relationship detection processing performed by a controller 21, as shown in a flowchart of FIG. 16, when decoding processing of S103 is performed, if at least one of one end side code Ca and the other end side code Cb is decoded (Yes in S104), the decoded end side code (one end side code Ca or the other end side code Cb) is stored in a storage portion 25 (S104a).

Figure 17:
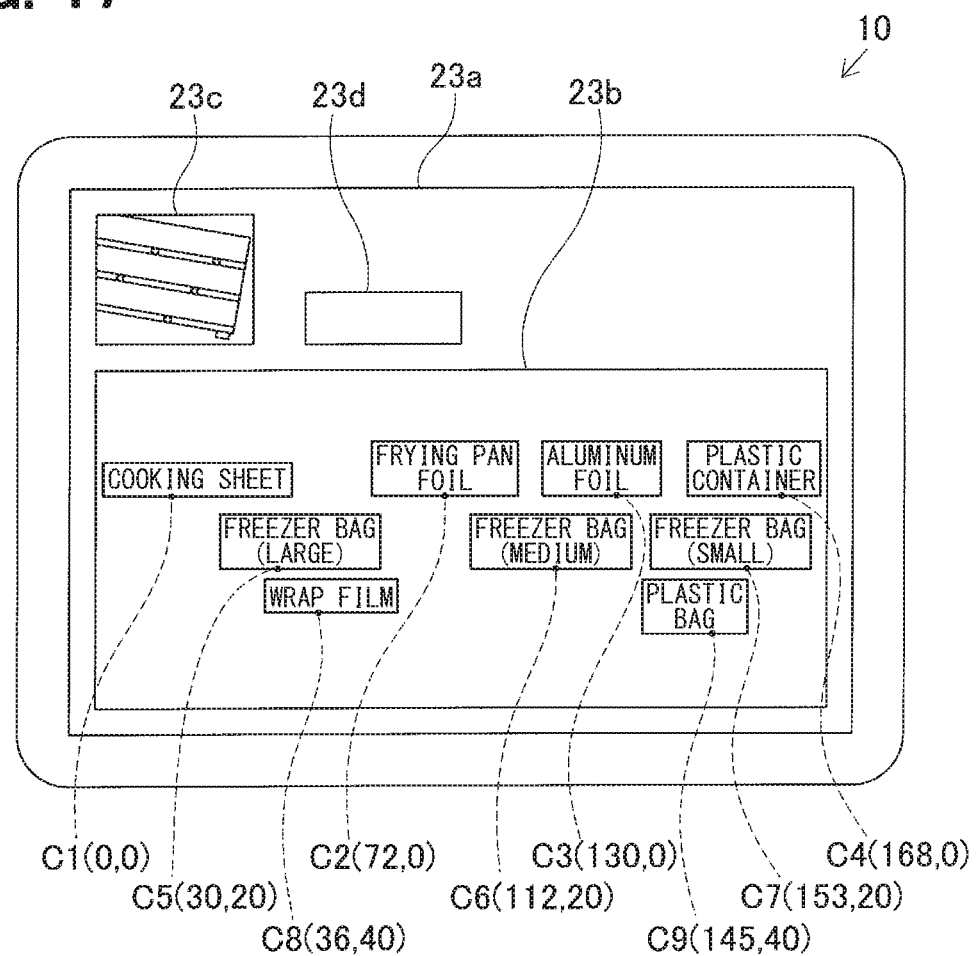
FIG. 17 is an explanatory diagram for describing a display state of a third display area in the second embodiment.

In display processing shown in S119a, the shelf information read from one end side code Ca or the other end side code Cb is displayed in a third display area 23*d*. For example, in a case where "shelf 1" is recorded as the shelf information in one end side code Ca and the other end side code Cb, "shelf 1" is displayed in the third display area 23*d* as shown in FIG. 17.

In determination processing of S125*a*, it is determined whether both of one end side code Ca and the other end side code Cb are stored in the storage portion 25. Here, in a case where both of one end side code Ca and the other end side code Cb are not stored in the storage portion 25 or only one of one end side code Ca and the other end side code Cb is stored in the storage portion 25, a determination is made to be No in S125*a*, it is considered that relative positional relationships among all the information codes are not detected, and processing from S101 is performed. When both of one end side code Ca and the other end side code Cb are stored in the storage portion 25, the respective information codes C1 to C9 provided in the display shelf 1 are read, and it is thus considered that relative positional relationships among all the information codes are detected, such that a determination is made to be Yes in S125*a*, and processing of S127 is performed.

As described above, in a mobile terminal 10 according to the present embodiment, one end side code Ca in which one end side information is recorded is arranged on the portion of the shelf board 2*a* positioned at one end of the display shelf 1 in the longitudinal direction, and the other end side code Cb in which the other end side information is recorded is arranged on the portion of the shelf board 2*c* positioned at the other end of the display shelf 1 in the longitudinal direction. One end side information or the other end side information that is read is stored in the storage portion 25 (S104*a*). Thus, from the fact that both of one end side information and the other end side information are stored in the storage portion 25, it is possible to determine that an imaging area is moved from one end of the display shelf 1 to the other end of the display shelf 1 in the longitudinal direction. It is possible to easily estimate that all the information codes C1 to C9 arranged in the display shelf 1 are read.

In particular, since the shelf information for specifying the display shelf 1 is included in one end side information and the other end side information, it is possible to not only grasp the display shelf from one end of the display shelf to the other end of the display shelf in the longitudinal direction, but also to easily grasp in which display shelf the positional relationships among articles are detected by viewing display in the third display area 23*d*.

Third Embodiment

A positional relationship detection device and a positional relationship detection system according to a third embodiment will be described with reference to the drawings.

The third embodiment is mainly different from the second embodiment in that actual distances or the like among respective information codes arranged in a display shelf are calculated in a state where sizes (actual dimensions) of the respective information codes are not acquired. Therefore, components that are substantially the same as those in the second embodiment will be denoted by the same reference numerals, and a description thereof will be omitted.

In the present embodiment, even in a state where the sizes of the respective information codes arranged in the display shelf are not directly acquired, size ratios of the remaining information codes to the reference code are calculated and relative positions of the respective information codes are detected, based on a reference code size in a captured image of the reference code described above (a size of an area occupied by the reference code in the captured image).

In the present embodiment, one end side code Ca and the other end side code Cb are also detection targets of relative positional relationships or the like, similar to the other information codes, and in order to accurately calculate the actual distances and dimensions only by the captured image, information on a length of the display shelf in a longitudinal direction (X direction) is included as a part of the shelf information in one end side information and the other end side information. The reason will be described below.

If the purpose is to grasp what goods are displayed on which stage of a display shelf, actual distances among the respective information codes or actual dimensions of the respective information codes need not be grasped, but in a case of wanting to obtain detailed information such as how much area the goods displayed in the display shelf use, or the like, the actual distances among the respective information codes or the actual dimensions of the respective information codes need to be grasped. However, in a state where the sizes of the respective information codes arranged in the display shelf are not directly acquired, even though it is possible to grasp relative positional relationships among the respective information codes in terms of a ratio from a plurality of pieces of relative position information stored in a storage portion 25, it is difficult to accurately calculate the actual distances or dimensions only by the captured image. In addition, for example, when information on the sizes of the respective information codes is added to and recorded in the respective information codes, code sizes are different from each other depending on amounts of recorded information and thus need to be input for each goods, which may take time and effort. In addition, when the code sizes of all the information codes are the same as each other, if in a case where an amount of recorded information is varied, the code sizes need to be unified to conform to an information code in which a larger amount of information is recorded, and thus, there is a case where it is not possible to satisfy a demand for making the information code as small as possible.

On the other hand, it can be considered that an actual distance between one end side code Ca and the other end side code Cb in the X direction coincides with a length of the display shelf in the X direction obtained by reading one end side code Ca or the other end side code Cb. For this reason, it is possible to calculate the actual distances among the respective information codes based on the other relative positional relationships by using a relative positional relationship between one end side code Ca and the other end side code Cb between which the actual distance can be grasped as a reference.

Figure 18:
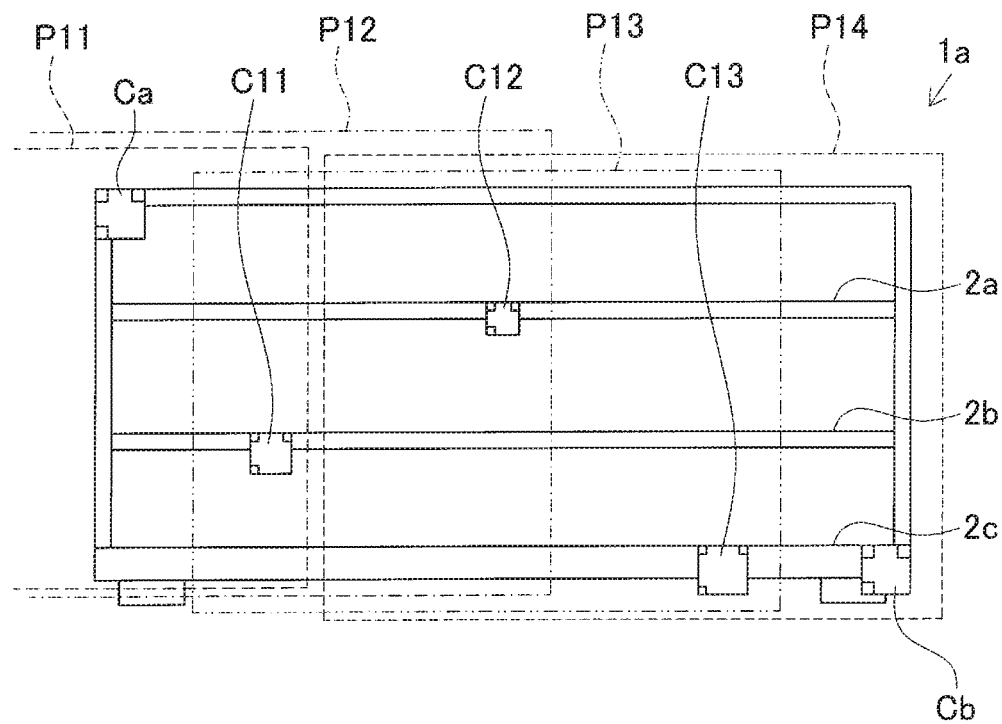
FIG. 18 is an explanatory diagram showing a display shelf of a detection target according to a third embodiment.

Hereinafter, positional relationship detection processing in the present embodiment will be described with reference to a flowchart shown in FIG. 19 using a display shelf 1*a* in which three information codes C11 to C13, one end side code Ca, and the other end side code Cb are arranged as shown in FIG. 18, as an example. In the present embodiment, for convenience of explanation, it is assumed that the information codes C11 to C13, one end side code Ca, and the other end side code Cb are arranged in a right opposite direction and the respective information code are imaged so that an X direction and an Xb direction coincide with each other. In addition, the information codes C11 to C13, one end side code Ca, and the other end side code Cb are formed as QR codes having a square shape, and in addition to the shelf information described above, a numerical value (for example, 100 cm) indicating an actual length of the display shelf 1a in the X direction is recorded as information on the length of the display shelf 1a in the X direction in one end side code Ca and the other end side code Cb. For this reason, as shown in FIG. 18, one end side code Ca is arranged so that an outer edge on one end side thereof coincides with an outer edge on one end side of the display shelf 1a, and the other end side code Cb is arranged so that an outer edge on the other end side thereof coincides with an outer edge on the other end side of the display shelf 1a.

Figure 20A:
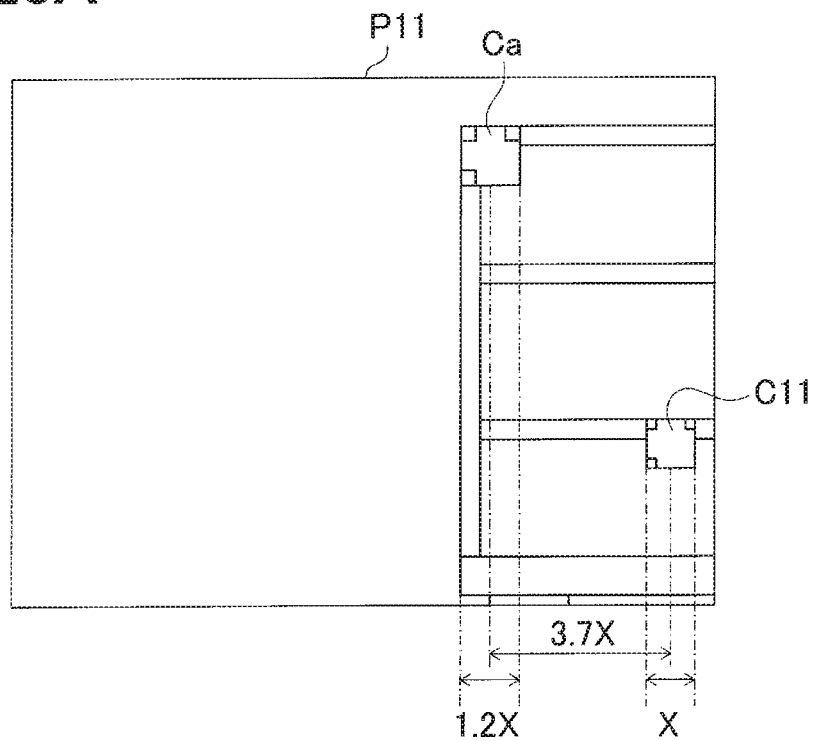
FIG. 20A is an explanatory diagram for describing a captured image of an imaging area P11 in FIG. 18.

Positional relationship detection processing starts by a controller 21, and when imaging of a plurality of codes in which two or more of information codes C11 to C13 in which specific information is recorded, one end side code Ca, and the other end side code Cb are included in one captured image is performed (Yes in S105 of FIG. 19), in a case in which a reference code is not set (No in S107), one of two or more information codes that are imaged is set as the reference code (S109). In this case, when one end side code Ca is imaged and decoding of one end side code Ca is successful (Yes in S104), one end side information read from one end side code Ca is stored in the storage portion 25 (S104a). In addition, for example, when an imaging area P11 of FIG. 18 is imaged, such that one end side code Ca and the information code C11 are first imaged as shown in FIG. 20A, the information code C11 is set as a reference code.

Then, in S111a, relative position information and rotation angle detection processing is detected. In this processing, in addition to detection of relative position information with respect to the reference code (information code C11) described above and rotation angles θ of the respective information codes, a length from the center of the reference code to the center of one end side code Ca in the Xb direction (X direction) and a size ratio of one end side code Ca to the reference code are calculated based on the size of the reference code, specifically, by setting a length of one side of the reference code to X. In an example of FIG. 20A, the length from the center of the reference code to the center of one end side code Ca in the Xb direction (X direction) is calculated as 3.7×, and the size ratio of one end side code Ca to the reference code is calculated as 1.2. In the present embodiment, an information code excluding one end side code Ca and the other end side code Cb, of two or more information codes imaged first, is set as the reference code, but the present disclosure is not limited thereto, and one of one end side code Ca and the other end side code Cb may be set as the reference code.

Figure 20B:
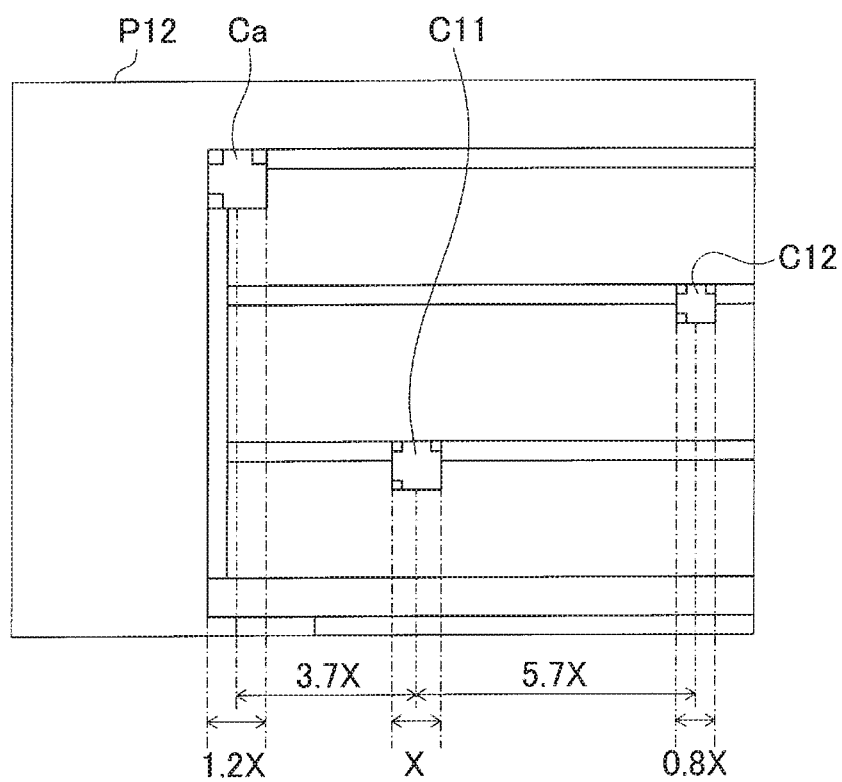
FIG. 20B is an explanatory diagram for describing a captured image of an imaging area P12 in FIG. 18.

When the imaging of the plurality of codes where two or more information codes in which specific information is recorded are included in one captured image captured subsequently is performed (Yes in S105), the reference code has already been set (Yes in S107), and the captured image is in a partially undetected state (Yes in S121), relative position information and rotation angle detection processing is performed in S123a. In this processing, in addition to the detection of the relative position information and the rotation angle θ of the undetected code described above, a length from the center of the reference code or the center of the detected code to the center of the undetected code in the Xb direction (X direction) and a size ratio of the undetected code to the reference code are calculated based on a size ratio of the reference code or the detected code. For example, when an imaging area by an imaging portion 22 is changed from an imaging area P11 to an imaging area P12 in FIG. 18, such that the information code C12 is newly imaged, a length from the center of the information code C11, which is the reference code, to the center of the information code C12, which is the undetected code, in the Xb direction (X direction) is calculated as 5.7×, and a size ratio of the information code C12 to the reference code is calculated as 0.8, as shown in FIG. 20B.

Figure 21A:
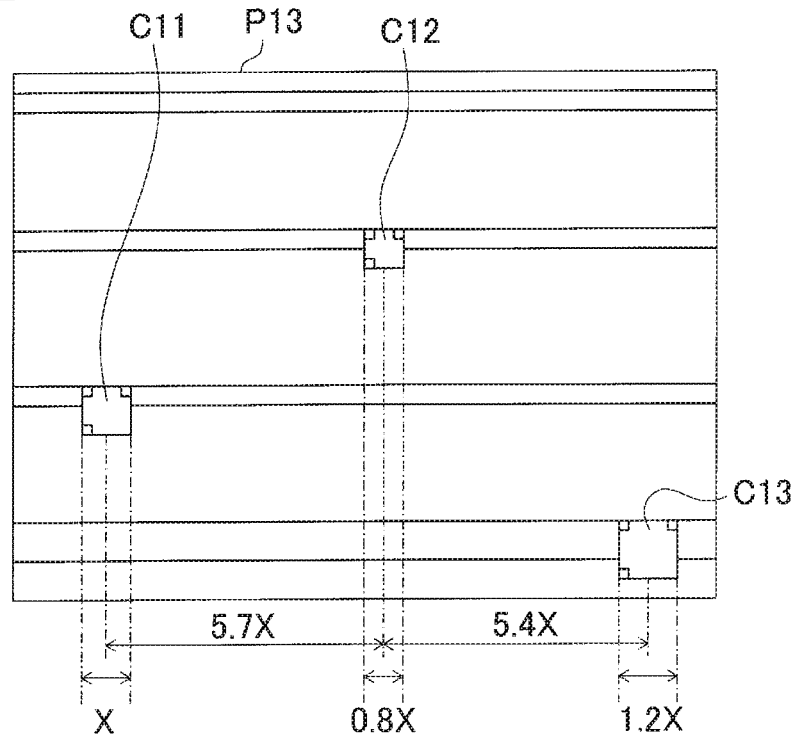
FIG. 21A is an explanatory diagram for describing a captured image of an imaging area P13 in FIG. 18.

Thereafter, similarly, when an imaging area by the imaging portion 22 is changed from the imaging area P12 to an imaging area P13 in FIG. 18, such that the information code C13 is newly imaged, it is determined that the captured image is in the partially undetected state (Yes in S121). In this case, as shown in FIG. 21A, a length from the center of the information code C12, which is the detected code, to the center of the information code C13, which is the undetected code, in the Xb direction (X direction) is calculated as 5.4×, and a size ratio of the information code C13 to the reference code is calculated as 1.2 (S123a).

Figure 21B:
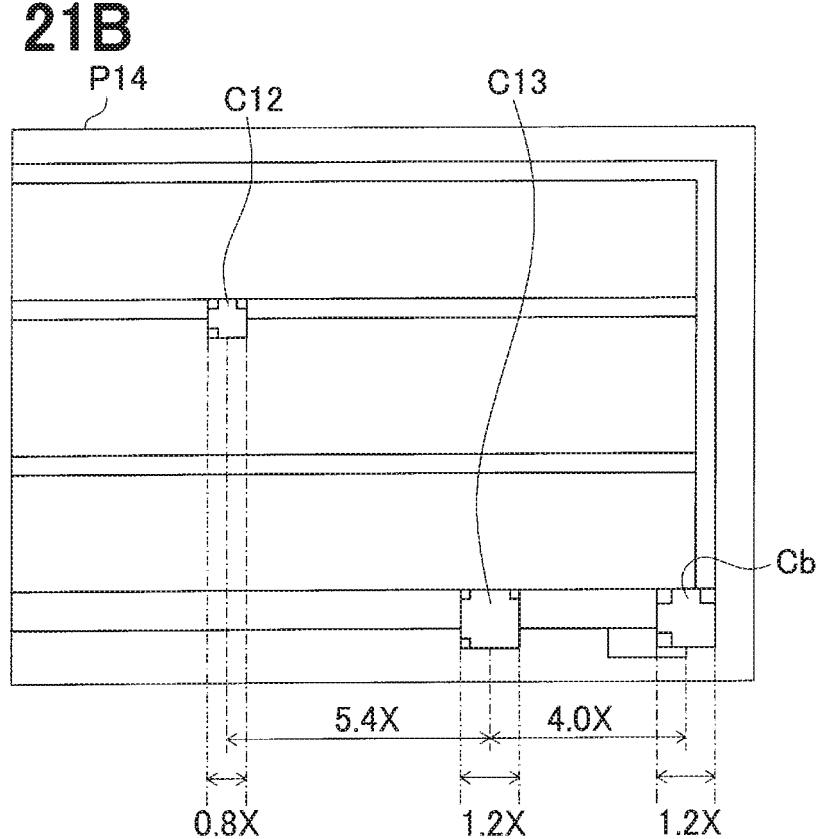
FIG. 21B is an explanatory diagram for describing a captured image of an imaging area P14 in FIG. 18.

Further, when an imaging area by the imaging portion 22 is changed from the imaging area P13 to an imaging area P14 in FIG. 18, such that the other end side code Cb is newly imaged and decoded, the other end side information read from the other end side code Cb is stored in the storage portion 25 (S104a), and it is determined that the captured image is in the partially undetected state (Yes in S121). In this case, as shown in FIG. 21B, a length from the center of the information code C13, which is the detected code, to the center the other end side code Cb in the Xb direction (X direction) is calculated as 4.0×, and a size ratio of the other end side code Cb to the reference code is calculated as 1.2 (S123a).

When both of one end side information and the other end side information are stored in the storage portion 25 in order to read one end side code Ca and the other end side code Cb (Yes in S125a), actual distance calculation processing shown in S126 is performed. In this processing, the actual distances among the respective information codes or the sizes of the respective information codes that are read are calculated on the basis of the information on the length of the display shelf in the X direction included in one end side information or the other end side information.

Figure 22:
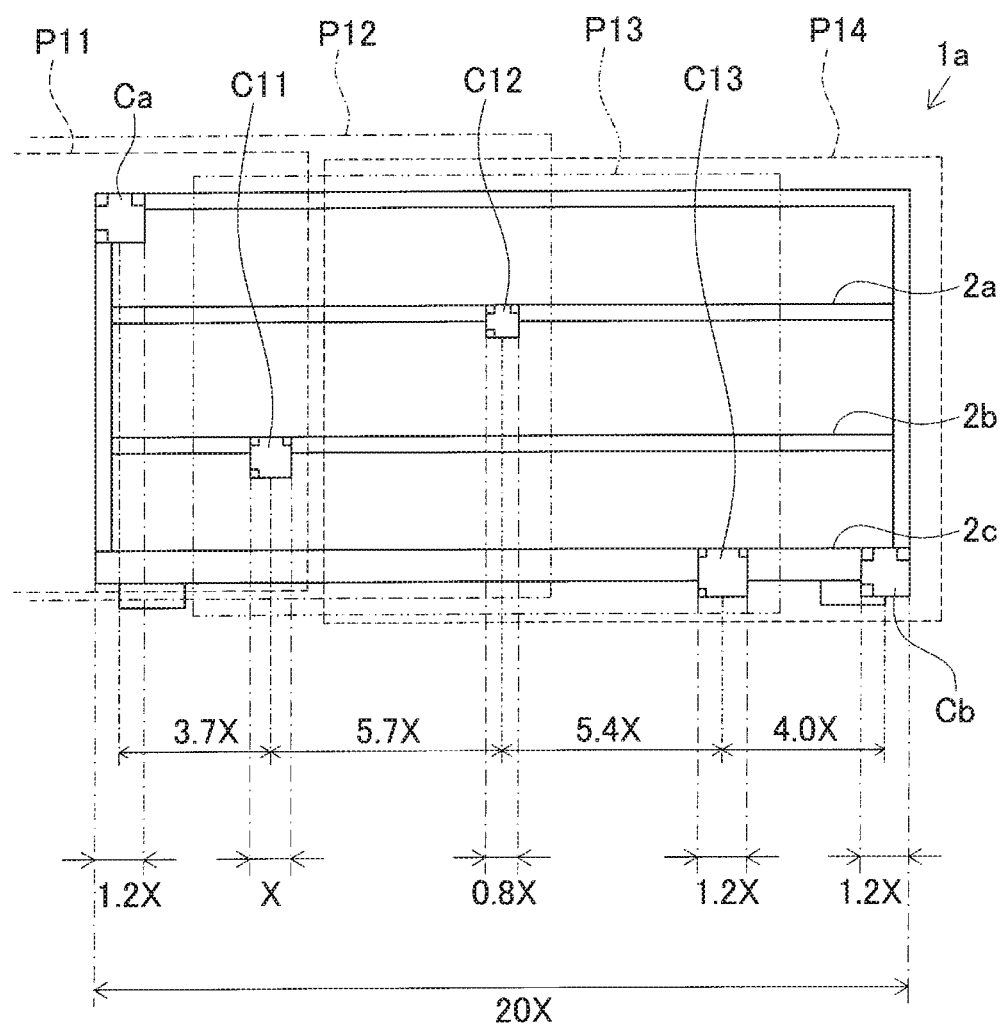
FIG. 22 is an explanatory diagram for describing a state where each captured image in FIG. 20A to FIG. 21B is transformed into a reference plane based on a reference code size.

Specifically, when ratio lengths and size ratios among the respective information codes with respect to the reference code are calculated as shown in FIGS. 20A to 21B, as seen from FIG. 22 in which the respective captured images of FIGS. 20A to 21B are transformed into a reference plane based on the reference code size, in the entire display shelf 1a, the relative positional relationships among the respective information codes can be grasped in terms of ratios. Further, a ratio length from one end side code Ca to the other end side code Cb can also be calculated on the basis of the size X of the reference code, it is considered that this ratio length coincides with the actual length of the display shelf in the X direction included in one end side information or the other end side information, such that it is possible to calculate the actual distances among the respective information codes or the actual sizes of the respective information codes.

When 100 cm is recorded as a numerical value indicating the actual length of the display shelf 1a in the X direction in one end side code Ca and the other end side code Cb, the ratio length from one end side code Ca to the other end side code Cb is 20×, and the length X of one side of the reference code can thus be calculated to be 5 cm. By calculating the length X of one side of the reference code as such, it is possible to calculate actual distances among the other information codes or the actual sizes of the respective information codes. For example, an actual distance from the center of the information code C11 to the center of the information code C12 can be calculated to be 28.5 cm since a ratio length between the information code C11 and the information code C12 is 5.7x. The controller 21 performing the actual distance calculation processing of S126 can correspond to an example of a calculation portion (also referred to as a calculation section).

Then, information on the relative positional relationships among the respective information codes calculated (detected) as such is transmitted as data for grasping the positional relationships among the respective goods displayed in the display shelf 1 to the server 4 through the communication portion 26 (S127), and the present positional relationship detection processing terminates.

As described above, in a mobile terminal 10 according to the present embodiment, in the positional relationship detection processing performed by the controller 21, at the time of imaging of the plurality of codes in a state where the detected code is not stored in the storage portion 25, for the two or more information codes that are imaged, the reference code size of any one information code is detected, the relative position information among the respective information codes and the rotation angles θ of the respective information codes are detected, and the size ratios of the remaining information codes to the reference code size are detected. In addition, in the positional relationship detection processing, for the captured image determined to be in the partially undetected state, the rotation angle θ of one detected code is detected, and the relative position information and the rotation angle θ of the undetected code and the size ratio of the undetected code to the reference code size are detected after the rotational projective transformation is performed on the captured image so that the detected rotation angle θ becomes the rotation angle θ stored in the storage portion 25 in relation to the detected code.

Thus, even in a case where the sizes (actual dimensions) of the respective information codes arranged in the display shelf are not grasped, it is possible to detect the size ratios of the remaining information codes based on the reference code size, which is an image size of the information code whose rotation angle θ is first detected, and it is thus possible to detect the relative positional relationships among the respective information codes in consideration of the size ratios.

In particular, one end side code Ca is arranged as an information code in which one end side information indicating one end of the display shelf in the longitudinal direction is recorded, on a portion of a shelf board positioned at one end of the display shelf in the longitudinal direction, the other end side code Cb is arranged as an information code in which the other end side information indicating the other end of the display shelf in the longitudinal direction is recorded on a portion of a shelf board positioned at the other end of the display shelf in the longitudinal direction, and the information on the length of the display shelf in the X direction is included in at least any one of one end side information and the other end side information. In the actual distance calculation processing of S126, the actual distances among the respective information codes are calculated on the basis of the plurality of pieces of relative position information, on the assumption that the actual distance between one end side code Ca and the other end side code Cb in the X direction coincides with the length of the display shelf in the X direction obtained by reading.

As such, it is possible to calculate the actual distances among the respective information codes based on the other relative positional relationships by using the relative positional relationship between one end side code Ca and the other end side code Cb between which the actual distance can be grasped as a reference.

In the actual distance calculation processing of S126, the relative positional relationships among the respective information codes in the X direction are detected, but the present disclosure is not limited thereto, and relative positional relationships between the respective information codes in a Y direction (a vertical direction: a lateral direction in FIG. 22 or the like) can also be detected. In this case, by including information on an actual length of the display shelf in the Y direction (an actual length between one end side code Ca and the other end side code Cb in the Y direction) in at least any one of one end side information and the other end side information, it is possible to improve calculation accuracy in the actual distance calculation processing.

The actual length of the display shelf in the X direction is not limited to be acquired by recording the numerical value of the actual length in one end side code Ca and the other end side code Cb, and may be acquired by using the shelf information recorded in one end side code Ca and the other end side code Cb. That is, the mobile terminal 10 can acquire the actual length of the display shelf in the X direction on the basis of the shelf information read from one end side code Ca or the other end side code Cb using a database in which the shelf information and the length of the display shelf in the X direction are recorded in association with each other. In this case, the shelf information for specifying the display shelf can correspond to an example of the information on the length of the display shelf in the X direction.

Fourth Embodiment

A positional relationship detection device and a positional relationship detection system according to a fourth embodiment will be described with reference to the drawings.

The fourth embodiment is mainly different from the first embodiment in that main portions of positional relationship detection processing performed by a mobile terminal 10 are performed by a server 4 and the mobile terminal 10 simply transmits a captured image to the server 4.

That is, a positional relationship detection system 3 according to the present embodiment is configured to include the mobile terminal 10 having an imaging portion 22 and the server 4 performing processing for detecting positional relationships among a plurality of types of articles using a captured image captured by the imaging portion 22. A communication portion 26 of the mobile terminal 10 functions as a transmission portion that transmits information including the captured image of the imaging portion 22 to the server 4 at a predetermined operation timing or the like.

For this reason, the server 4 is configured to include a communication portion 8 which functions as a reception portion receiving the information transmitted by the transmission portion, a controller 5 which functions as a reading part reading information codes included in the captured image received by the communication portion 8, a controller 5 which functions as a detection portion detecting a rotation angle of any one information code and detecting relative position information on relative positions among respective information codes and rotation angles of the respective information codes after performing rotational projective transformation on the captured image so that the detected rotation angle becomes a prescribed angle, for two or more information codes, at the time of imaging of a plurality of codes in which the two or more information codes whose specific information is read by the reading part are included in one captured image received by the communication portion 8, a storage portion 6 in which the specific information of the information codes whose relative position information and rotation angles are detected by the detection portion is stored as information of detected codes together with a detection result by the detection portion, a controller 5 which functions as an update portion updating the relative position information and the rotation angles stored in the storage portion 6 in response to an imaging state of a guide code included in the captured image received by the communication portion 8, and a controller 5 which functions as a determination portion determining whether the captured image is in a partially undetected state where an information code whose specific information is not stored in the storage portion 6 is included as an undetected code together with at least one detected code at the time of the imaging of the plurality of codes, in order to execute processing equivalent to the positional relationship detection processing described above. The detection portion detects the relative position information among the respective information codes and the rotation angles of the respective information codes for the two or more information codes that are imaged, at the time of the imaging of the plurality of codes in a state where the detected code is not stored in the storage portion 6, and detects a rotation angle of one detected code and detects relative position information and a rotation angle of the undetected code after performing the rotational projective transformation on the captured image so that the detected rotation angle becomes a rotation angle stored in the storage portion 6 in relation to the detected code, for the captured image determined to be in the partially undetected state by the determination portion. In addition, in a case where a rotation angle of the guide code is detected by the detection portion, the update portion performs rotational projective transformation to correct a virtual plane in which the respective information codes are virtually arranged in response to the relative position information and the rotation angles stored in the storage portion 6 until the detection of the rotation angle of the guide code so that the detected rotation angle of the guide code becomes a prescribed angle, and updates the relative position information and the rotation angles stored in the storage portion 6 in response to the relative position information and the rotation angles of the respective information codes virtually arranged on the virtual plane after being corrected.

Even in this case, it is possible to realize the positional relationship detection system 3 achieving an effect similar to that of the first embodiment. Further, other terminals capable of communicating with the server 4 can perform processing for managing the positional relationships and the like among the respective articles displayed in the display shelf 1 by obtaining the relative position information and the rotation angles stored in the storage portion 6 from the server 4.

The present disclosure is not limited to each embodiment or the like, and may be implemented as follows, for example.

The present disclosure is not limited to be applied to a mobile terminal (corresponding to a positional relationship detection device) that detects the relative positional relationships among the displayed goods G1 to G9 using the information codes, and may be applied to a mobile terminal (positional relationship detection device) that detects relative positional relationships between other types of articles such as food or miscellaneous goods in a state where these articles are displayed, using information codes. In addition, the present disclosure can also be applied to the positional relationship detection system including the positional relationship detection device as described above and the display shelf in which the respective information codes are installed.

The guide code Cg is not limited to be arranged in the vicinity of the right end of the shelf board 2a, and may be arranged in the vicinity of right ends of the shelf boards 2b and 2c or in the vicinity of left ends of the shelf boards 2a to 2c or may be arranged in the vicinity of the centers of the shelf boards 2a to 2c in the longitudinal direction. In addition, a single guide code Cg is not limited to be arranged in the display shelf 1, and a plurality of guide codes Cg may be arranged in the display shelf 1, In addition, the guide code Cg is not limited to be arranged in the right opposite direction with respect to the shelf board, and may be arranged so that the rotation angle θ of the guide code Cg with respect to the shelf board becomes a prescribed angle (for example, 45°) set in advance so as to be different from 0°.

In the positional relationship detection processing, the information code first read by being positioned on the upper left side of the captured image is not limited to be set as the reference code, and any information code that is to be imaged may be set as the reference code. In addition, when the reference code is not imaged by moving the imaging area, one of the plurality of information codes imaged at that point in time may be newly set as the reference code. In this case, each relative position information calculated so far and stored in the storage portion 25 can be updated in response to the newly set reference code.

The display screen 23a is not limited to display both of the first display area 23b and the second display area 23c, and, for example, in a mobile terminal having a small screen size, the first display area 23b may be displayed widely by not displaying the second display area 23c.

In the transformation processing into the reference plane in the positional relationship detection processing, for example, processing for calculating a transformation matrix in which one information code is in the right opposite direction and has the same size as an actual code size and transforming the other information codes to obtain an image which is in the right opposite direction and has the same size as those of actual articles by the matrix may be performed. If this processing is also performed similarly on other images, position information in the respective images becomes equivalent, and can thus be easily connected to each other. In addition, a method of grasping the positions of the respective information codes by a general method of estimating a position from the imaging portion 22 may be used. In addition, a position that becomes a reference of connection may be detected by a matching method by a feature amount, such as SURF or SIFT or by matching between information recorded in information codes.

The display shelf 1 is not limited to be configured to be partitioned by the three shelf boards 2a to 2c, and may be configured to be partitioned by two shelf boards or may be configured to be partitioned by four or more shelf boards, for example. In addition, the information codes are not limited to be arranged by using a plurality of shelf boards vertically partitioning the display shelf 1, and may be arranged by using, for example, shelf boards horizontally partitioning the display shelf 1 or shelf boards constituting side boards.

The present disclosure is not limited to be applied to a positional relationship detection device that detects the positional relationships among the plurality of types of articles displayed in the display shelf long in the horizontal direction, and may be applied to a positional relationship detection device that detects positional relationships among a plurality of types of articles displayed in a display shelf long in the vertical direction or may be applied to a positional relationship detection device that detects positional relationships among a plurality of types of articles displayed in a display shelf long in the vertical direction and long in the horizontal direction.

The specific information recorded in the respective information codes C1 to C9 may be a type names themselves of corresponding goods or unique numbers or the like for specifying type names of corresponding goods from a correspondence table prepared in advance.

The respective information codes provided in the display shelf 1 are not limited to be formed as the OR codes, and may be formed as information codes whose rotation angles θ can be detected, for example, another code type of information codes such as one-dimensional codes such as barcodes or two-dimensional codes such as data matrix codes or Maxi codes. The respective information codes may be formed so that code types of some information codes are different on the assumption that the information on the sizes of the codes is recorded as described above.

It is noted that a flowchart or the processing of the flowchart in the present application includes multiple steps (also referred to as sections), each of which is represented, for instance, as S101. Further, each step can be divided into several sub-steps while several steps can be combined into a single step.

While various embodiments, configurations, and aspects of positional relationship detection device and positional relationship detection system according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A positional relationship detection device that detects positional relationships among a plurality of types of articles displayed in a display shelf partitioned by a plurality of shelf boards,
    information codes with specific information recorded being arranged at respective positions at which respective types of articles are displayed, the specific information being configured to specify the types of the articles by using the shelf boards,
    a guide code with prescribed arrangement information recorded being disposed such that a rotation angle of the guide code becomes a prescribed angle with respect to the shelf boards, the prescribed arrangement information indicating that the guide code is an information code arranged such that the rotation angle of the guide code with respect to the shelf boards becomes the prescribed angle,
    the positional relationship detection device comprising:
    an imaging portion;
    a reading section that reads an information code included in a captured image captured by the imaging portion;
    a detection section that detects a rotation angle of any one information code of two or more information codes and, after performing rotational projective transformation on one captured image such that the detected rotation angle becomes the prescribed angle, detects relative position information on relative positions among the information codes and rotation angles of the respective information codes, at a time of imaging a plurality of codes in which the two or more of the information codes having the specific information are included in the captured image captured by the imaging portion, the specific information being read by the reading section;
    a storage portion that stores, as information of detected codes, the specific information of the information codes whose relative position information and rotation angles are detected by the detection section together with a detection result by the detection section;
    an update section that updates the relative position information and the rotation angles stored in the storage portion in response to an imaging state of the guide code imaged by the imaging portion; and
    a determination section that determines whether the captured image is in a partially undetected state where the information code whose specific information is not stored in the storage portion is included as an undetected code together with at least one detected code at the time of the imaging of the plurality of codes,
    wherein:
    the detection section detects the relative position information among the respective information codes and the rotation angles of the respective information codes for the two or more information codes that are imaged, at the time of the imaging of the plurality of codes in a state where the storage portion does not store the detected code;
    the detection section detects a rotation angle of the one detected code and detects the relative position information and the rotation angle of the undetected code after performing the rotational projective transformation on the captured image so that the detected rotation angle becomes the rotation angle stored in the storage portion in relation to the detected code, for the captured image determined to be in the partially undetected state by the determination section;
    the update section performs rotational projective transformation to correct a virtual plane in which the respective information codes are virtually arranged in response to the relative position information and the rotation angles stored in the storage portion until detection of a rotation angle of the guide code so that a detected rotation angle of the guide code becomes the prescribed angle in a case where the detection section detects the rotation angle of the guide code; and
    the update section updates the relative position information and the rotation angles stored in the storage portion in response to the relative position information and the rotation angles of the respective information codes virtually arranged on the virtual plane after being corrected.

2. The positional relationship detection device according to claim 1, wherein:
    the information code records information on a size of the corresponding information code, in addition to the specific information.

3. The positional relationship detection device according to claim 1, wherein:
    all the information codes have an identical size.

4. The positional relationship detection device according to claim 1, wherein:
    an information code in which one end side information indicating one end of the display shelf in a longitudinal direction is recorded is arranged on a portion of the shelf board positioned at the one end of the display shelf in the longitudinal direction; and
    an information code in which a different end side information indicating the different end of the display shelf in the longitudinal direction is recorded is arranged on a portion of the shelf board positioned at the different end of the display shelf in the longitudinal direction; and the storage portion stores the one end side information read by the reading section and the different end side information read by the reading section.

5. The positional relationship detection device according to claim 4, wherein:
at least any one of the one end side information and the different end side information includes information for specifying the display shelf.

6. The positional relationship detection device according to claim 1, wherein:
the detection section detects a reference code size that becomes an image size occupied by any one information code in the captured image, detects the relative position information among the respective information codes and the rotation angles of the respective information codes, and detects size ratio of a remaining information code to the reference code size, for the two or more information codes that are imaged, at a time of the imaging of the plurality of codes in the state where the storage portion does not store the detected code, and the detection section detects the rotation angle of the one detected code, and detects the relative position information and the rotation angle of the undetected code, and detects a size ratio of the undetected code to the reference code size after performing the rotational projective transformation on the captured image so that the detected rotation angle becomes the rotation angle stored in the storage portion in relation to the detected code, for the captured image determined to be in the partially undetected state by the determination section.

7. The positional relationship detection device according to claim 6, further comprising:
a calculation section that calculates an actual distance among the respective information codes based on a plurality of pieces of relative position information stored in the storage portion,
wherein:
one end side code is arranged as an information code in which one end side information indicating one end of the display shelf in a longitudinal direction is recorded on a portion of the shelf board positioned at one end of the display shelf in the longitudinal direction;
a different end side code is arranged as an information code in which the different end side information indicating the different end of the display shelf in the longitudinal direction is recorded on a portion of the shelf board positioned at the different end of the display shelf in the longitudinal direction;
at least any one of the one end side information and the other end side information includes information on a length of the display shelf in the longitudinal direction; and
the calculation section calculates the actual distances among the respective information codes based on the plurality of pieces of relative position information, on an assumption that an actual distance between the one end side code and the different end side code in the longitudinal direction coincides with the length of the display shelf in the longitudinal direction obtained by reading of the reading section.

8. The positional relationship detection device according to claim 1, further comprising:

a display portion having a first display area and a second display area,
wherein:
the first display area displays information indicating a type of articles each specified from the two or more detected codes stored in the storage portion in response to the relative position information; and
the second display area displays a current captured image captured by the imaging portion.

9. A positional relationship detection system comprising:
the positional relationship detection device according to claim 1; and
a server that manages the positional relationship detection device,
wherein:
the positional relationship detection device includes
a transmission portion that transmits at least a part of information stored in the storage portion to the server at a predetermined timing, and
the server includes
a reception portion that receives the information transmitted by the transmission portion, and
a management portion that manages positional relationships among a plurality of types of articles displayed in the display shelf using a reception result by the reception portion.

10. A positional relationship detection system that detects positional relationships among a plurality of types of articles displayed in a display shelf partitioned by a plurality of shelf boards,
the positional relationship detection system comprising:
a mobile terminal that includes an imaging portion; and
a server that performs processing for detecting the positional relationships among the plurality of types of articles using a captured image captured by the imaging portion,
wherein:
information codes with specific information recorded being arranged at respective positions at which respective types of articles are displayed, the specific information being configured to specify the types of the articles by using the shelf boards;
a guide code with prescribed arrangement information recorded being disposed such that a rotation angle of the guide code becomes a prescribed angle with respect to the shelf boards, the prescribed arrangement information indicating that the guide code is an information code arranged such that the rotation angle of the guide code with respect to the shelf boards becomes the prescribed angle;
the mobile terminal includes a transmission portion that transmits information including the captured image of the imaging portion to the server at a predetermined timing;
the server includes
a reception portion that receives the information transmitted by the transmission portion,
a reading section that reads the information codes included in the captured image received by the reception portion,
a detection section that detects a rotation angle of any one information code of two or more information codes and, after performing rotational projective transformation on one captured image such that the detected rotation angle becomes the prescribed angle, detects relative position information on relative positions among the respective information codes and rotation angles of the respective information codes, at a time of imaging a plurality of codes in which the two or more of the information codes having the specific information are included in the captured image received by the reception portion, the specific information being read by the reading section, a storage portion that stores, as information of detected codes, the specific information of the information codes whose relative position information and rotation angles are detected by the detection section together with a detection result by the detection section, an update section that updates the relative position information and the rotation angles stored in the storage portion in response to an imaging state of the guide code included in the captured image received by the reception portion, and a determination section that determines whether the captured image is in a partially undetected state where the information code whose specific information is not stored in the storage portion is included as an undetected code together with at least one detected code at the time of the imaging of the plurality of codes;

the detection section detects the relative position information among the respective information codes and the rotation angles of the respective information codes for the two or more information codes that are imaged, at the time of the imaging of the plurality of codes in a state where the storage portion does not store the detected code;

the detection section detects a rotation angle of the one detected code and detects the relative position information and the rotation angle of the undetected code after performing the rotational projective transformation on the captured image so that the detected rotation angle becomes the rotation angle stored in the storage portion in relation to the detected code, for the captured image determined to be in the partially undetected state by the determination section;

the update section performs rotational projective transformation to correct a virtual plane in which the respective information codes are virtually arranged in response to the relative position information and the rotation angles stored in the storage portion until detection of a rotation angle of the guide code so that a detected rotation angle of the guide code becomes the prescribed angle in a case where the detection section detects the rotation angle of the guide code; and the update section updates the relative position information and the rotation angles stored in the storage portion in response to the relative position information and the rotation angles of the respective information codes virtually arranged on the virtual plane after being corrected.

* * * * *